US007768885B2

(12) United States Patent
Kitagaki et al.

(10) Patent No.: US 7,768,885 B2
(45) Date of Patent: Aug. 3, 2010

(54) METHOD FOR EVALUATING OPTICAL RECORDING MEDIUM, OPTICAL RECORDING MEDIUM, AND INFORMATION-RECORDING/REPRODUCING APPARATUS

(75) Inventors: Naoki Kitagaki, Ibaraki (JP); Makoto Miyamoto, Ibaraki (JP); Makoto Iimura, Ibaraki (JP); Satoshi Sukada, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 1025 days.

(21) Appl. No.: 11/389,099

(22) Filed: Mar. 27, 2006

(65) Prior Publication Data
US 2006/0221787 A1  Oct. 5, 2006

(30) Foreign Application Priority Data
Mar. 29, 2005  (JP)  ............... 2005-093842

(51) Int. Cl.
*G11B 15/52*  (2006.01)
(52) U.S. Cl. .................................... 369/47.5
(58) Field of Classification Search .............. None
See application file for complete search history.

(56) References Cited

U.S. PATENT DOCUMENTS

| 5,234,799 | A | * | 8/1993 | Nagae et al. ............ 430/345 |
| 5,398,223 | A | * | 3/1995 | Tsujioka et al. ......... 369/53.27 |
| 7,489,607 | B2 | * | 2/2009 | Tsuneki ................... 369/53.31 |
| 2003/0081509 | A1 | * | 5/2003 | Murakami et al. ....... 369/13.07 |
| 2003/0112731 | A1 | * | 6/2003 | Ohkubo .................. 369/59.11 |
| 2005/0157628 | A1 | * | 7/2005 | Wilkinson et al. ....... 369/275.1 |
| 2005/0213487 | A1 | * | 9/2005 | Yamamoto et al. ......... 369/288 |

FOREIGN PATENT DOCUMENTS

| JP | A 4-364225 | 12/1992 |
| JP | A 10-134437 | 5/1998 |
| JP | A 2001-250274 | 9/2001 |
| JP | A 2003-6872 | 1/2003 |
| JP | A 2003-6941 | 1/2003 |
| JP | A 2003-006941 | 1/2003 |
| JP | A 2003-272160 | 9/2003 |
| JP | A 2003-331460 | 11/2003 |
| JP | A 2004-319068 | 11/2004 |
| JP | A 2005-25900 | 1/2005 |
| JP | A 2005-78777 | 3/2005 |
| JP | A 2005-535061 | 11/2005 |
| WO | WO 2004/013845 A1 | 2/2004 |

* cited by examiner

*Primary Examiner*—Wayne R Young
*Assistant Examiner*—Carl Adams
(74) *Attorney, Agent, or Firm*—Oliff & Berridge, PLC

(57) ABSTRACT

The reproduction durability of an optical recording medium is evaluated highly accurately in a short period of time by providing a method for evaluating the optical recording medium, the method including determining an operating laser power for heating a recording layer to a recording operating temperature; determining a temperature of the recording layer when a laser beam having a predetermined reproducing laser power is radiated during a data reproduction; determining a relationship between the reproducing laser power during the data reproduction and a reproduction durability times at the reproducing laser power; and determining a relationship between the temperature of the recording layer during the data reproduction and the reproduction durability times from the relationship between the reproducing laser power during the data reproduction and the reproduction durability times.

12 Claims, 8 Drawing Sheets

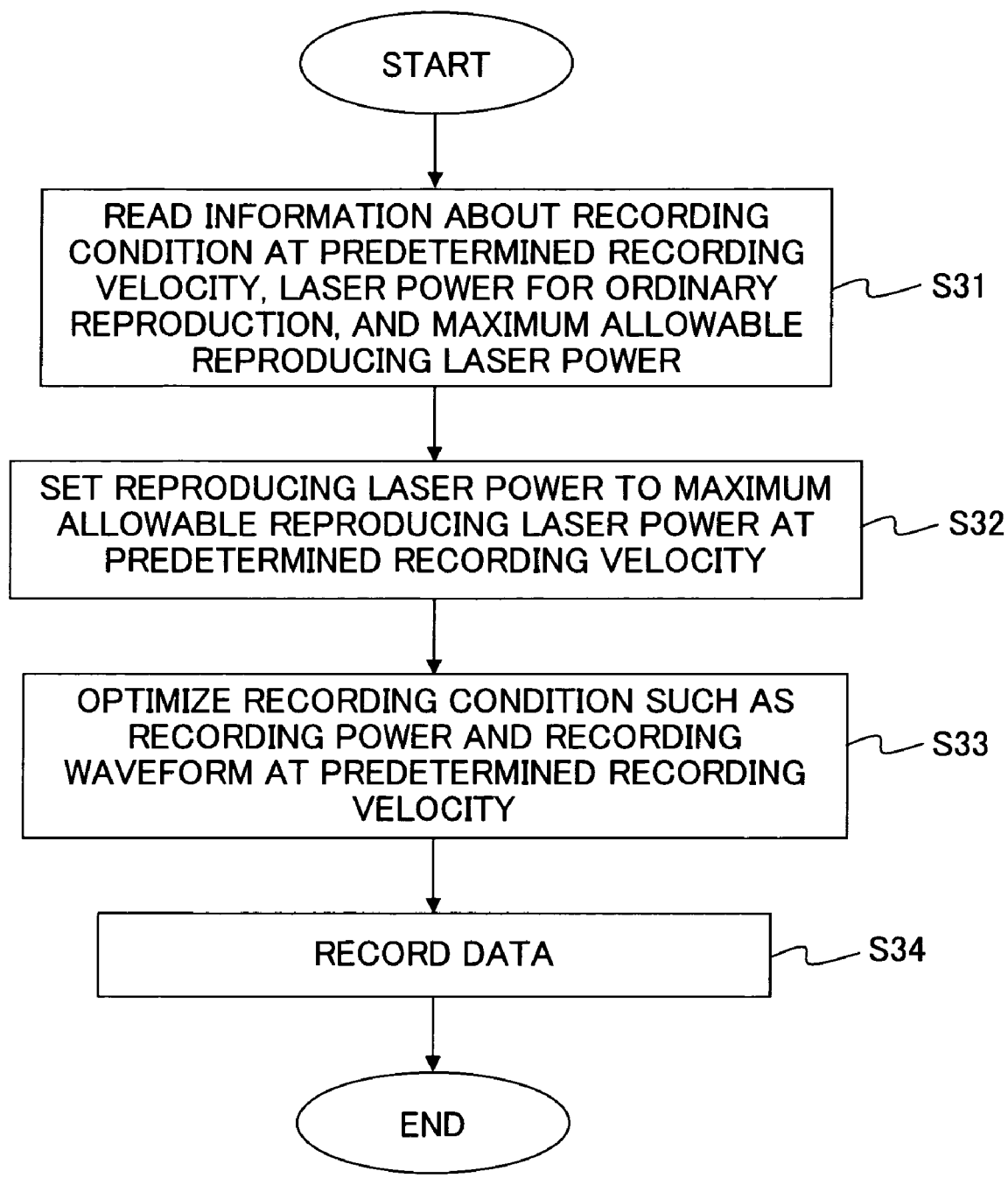

METHOD FOR EVALUATING OPTICAL RECORDING MEDIUM, OPTICAL RECORDING MEDIUM, AND INFORMATION-RECORDING/REPRODUCING APPARATUS

BACKGROUND OF THE INVENTION

1. Field of the Invention

The present invention relates to a method for evaluating reproduction durability reproduction of an optical recording medium capable of recording information by being irradiated with a laser beam, the optical recording medium, and an information-recording/reproducing apparatus.

2. Description of the Related Art

In recent years, the market of the read-only type optical disk such as DVD-ROM and DVD-Video is expanded. The write-once type DVD disk such as DVD-R and DVD+R as well as the rewritable type DVD disk such as DVD-RAM, DVD-RW, and DVD+RW is also introduced into the market. The DVD disk is used as the backup medium for the computer and the image-recording medium with which VTR is to be replaced and then the market of DVD is expanding. On the other hand, the magnetic super resolution technique is used as the technique for realizing the high density in relation to the magneto-optical (MO) disk. In future, the advance of the high density will be further spurred, and the expansion of the market will be expected.

In the case of the optical recording medium as described above, the recording is performed by collecting the laser beam on the recording layer to convert the light energy into the thermal energy so that the characteristics (property and state) of the recording layer is changed, for example, by means of the melting, the decomposition or the removal, or the direction of the magnetization is changed. The reproduction is performed by utilizing the difference in the characteristics between the recorded portion and the non-recorded portion, for example, the difference in the amount of the reflected light or the difference in the direction of the magnetization. Usually, the laser power, which is used during the reproduction, is a low power which does not exert any influence on the characteristics of the recording mark or the direction of the magnetization. However, when the reproduction is repeatedly performed, then the deterioration of the characteristics of the recording mark is caused, or the direction of the magnetization is changed. Therefore, it is extremely important to guarantee the reproduction durability at the reproducing laser power which is at the practical power level as described above. However, for example, in order to guarantee the reproduction for one million times as the reproduction durability, it is necessary that the reproduction should be actually performed repeatedly one million times. Therefore, when the reproducing laser power, which is suitable for the reproduction on the optical recording medium, is determined, and/or when the optical recording medium and/or the information-recording/reproducing apparatus, in which the reproduction durability is to be secured, is developed, then it is necessary that the playback test or the reproduction test should be repeatedly performed a huge number of times.

An acceleration test method, which is disclosed, for example, in Japanese Patent Application Laid-open No. 2003-006941, is hitherto known as a method for evaluating the reproduction durability of the optical recording medium accurately in a short period of time. In this test method, the reproduction durability times (the number of times of reproduction durability) is firstly investigated at a plurality of reproducing powers which is higher than the reproducing power to be used during the ordinary reproduction of information. Subsequently, an obtained result is used to determine the relational expression between the common logarithm of the reproduction durability times and the reproducing power by means of the least square method as a linear approximate expression. The reproduction durability times at an arbitrary reproducing power is estimated from the approximate expression.

SUMMARY OF THE INVENTION

The guaranteed operating environment for the optical disk, which is required by European Computer Manufacturers Association (ECMA) to promote the global standardization of the optical recording medium, is 50° C. for MO (ECMA-154), 60° C. for DVD-RAM (ECMA-272), 55° C. for DVD+RW (ECMA-274), and 55° C. for DVD–R (ECMA-279) in relation to the high temperature environment. In other words, it is necessary for the optical recording media as described above to guarantee the predetermined reproduction durability not only in the room temperature environment but also in the high temperature environment at 50° C. to 60° C. It is also extremely important to perform the reproduction durability test in the high temperature environment.

The present inventors have diligently made the investigation about the reproduction durability of the optical recording medium in the high temperature environment. As a result, the technique of Japanese Patent Application Laid-open No. 2003-006941 described above makes it possible to evaluate the reproduction durability of the optical recording medium at room temperature around 25° C. However, this technique has failed to correctly evaluate the reproduction durability at the high temperature which is, for example, 50° C. to 60° C. that is required by ECMA.

The present invention has been made in order to solve the above problem. An object of the present invention is to provide a method for accurately evaluating the reproduction durability at a desired temperature and at a desired reproducing laser power by means of a convenient process in a short period of time, when the data is reproduced on an optical recording medium.

According to a first aspect of the present invention, there is provided a method for evaluating reproduction durability of an optical recording medium which has a recording layer and from which information is reproduced by irradiation of a laser beam, the method comprising:

determining an operating laser power for heating the recording layer to a recording operating temperature;

determining a temperature of the recording layer when the laser beam having a predetermined reproducing laser power is radiated during a data reproduction, on the basis of an ambient temperature and the reproducing laser power during the data reproduction, and the operating laser power;

determining a relationship between the reproducing laser power during the data reproduction and a reproduction durability times at the reproducing laser power;

determining a relationship between the temperature of the recording layer during the data reproduction and the reproduction durability times from the relationship between the reproducing laser power during the data reproduction and the reproduction durability times; and determining a reproduction durability times at least at one of a desired ambient temperature and a desired reproducing laser power, from the relationship between the temperature of the recording layer and the reproduction durability times at the reproducing laser power.

In the method for evaluating the optical recording medium according to the present invention, the determination of the reproduction durability times at least at one of the desired ambient temperature and the desired reproducing laser power may include execution of an Arrhenius plot on the basis of the temperature of the recording layer during the data reproduction and the reproduction durability times at the reproducing laser power.

As a result of the diligent investigation by the present inventors about the reproduction durability of the optical recording medium in the high temperature environment, it has been revealed that the reproduction durability evaluated at room temperature is greatly different from the reproduction durability evaluated at the high temperature. Therefore, the following fact has been revealed. That is, as described above, the evaluation method described in Japanese Patent Application Laid-open No. 2003-006941 makes it possible to evaluate the reproduction durability of the optical recording medium at room temperature around 25° C. However, it is impossible to evaluate the reproduction durability at the high temperature such as 50° C. to 60° C. as required by ECMA, for the following reason. That is, in the evaluation method described in Japanese Patent Application Laid-open No. 2003-006941, the temperature dependency of the reproduction durability is not considered at all. According to the result of the investigation performed by the present inventors, it has been revealed that the reproduction durability, which is determined in the high temperature environment such as 50° C. to 60° C., is much lower than the reproduction durability which is determined at room temperature around 25° C. Therefore, when the reproduction durability of the optical recording medium is guaranteed, it is important to consider the temperature of the environment (ambient temperature) in which the data is reproduced.

The following method may be conceived as a method for solving the problem as described above. That is, the reproduction durability test is performed for a long period of time in an environment at a high temperature such as 50° C. to 60° C. for the optical recording medium and the information-recording/reproducing apparatus. However, this method gives the deterioration of the evaluating system itself. Therefore, this method is practically difficult to be carried out in view of the economy as well.

The present inventors have found out the fact that the reproducing velocity is also important for the evaluation of the reproduction durability. For example, in the case of DVD, the reproducing velocity is variable from the standard velocity to the 16x velocity. In the case of the 16x velocity, it is necessary that the laser beam is radiated at a reproducing laser power higher than a reproducing laser power for the standard velocity. That is, it has been revealed that even when the reproduction can be repeatedly performed at a predetermined reproduction durability times with a reproducing laser power of about 1 mW at the standard velocity, the reproduction durability at the 16x velocity is remarkably lowered as compared with the reproduction durability at the standard velocity, because in the 16x velocity, the reproduction is repeatedly performed at the reproducing laser power higher than that at the standard velocity. According to the fact as described above, the following fact has been revealed. That is, it is necessary that the reproduction durability of the optical recording medium is evaluated from the both viewpoints of the temperature of the use environment and the reproducing velocity (i.e., the reproducing laser power).

In the method for evaluating the optical recording medium of the present invention, at first, the temperature of the recording layer, which is obtained when the data is reproduced at a predetermined ambient temperature and a predetermined reproducing laser power, is determined on the basis of the ambient temperature, the reproducing laser power, and the laser power (operating laser power) required to heat the recording layer to the recording operating temperature. Further, the reproduction durability times is determined at the reproducing laser power during the data reproduction. It is possible to introduce the Arrhenius expression into the relationship between the determined temperature of the recording layer during the data reproduction and the determined reproduction durability times. Therefore, it is satisfied the relationship in which the logarithmic value of the reaction velocity (corresponding to the reproduction durability times) is proportional to the inverse number ($1/T$) of the temperature. For example, the temperature of the recording layer and the reproduction durability times are determined under the conditions of various ambient temperatures and/or various reproducing laser powers. The obtained result is used to execute the Arrhenius plot so that the relationship between the temperature of the recording layer and the reproduction durability times is determined. According to this relationship, it is possible to determine the reproduction durability times of the optical recording medium at a desired temperature of the recording layer.

As described above, in the method for evaluating the optical recording medium of the present invention, the ambient temperature and the reproducing laser power are considered when the temperature of the recording layer is determined. The condition of the environmental temperature and the high power reproduction are treated as the condition of the temperature of the recording layer. That is, in the method for evaluating the optical recording medium of the present invention, the ambient temperature and/or the reproducing laser power is converted into the temperature of the recording layer to evaluate the reproduction durability. Therefore, in the method for evaluating the optical recording medium of the present invention, it is possible to determine (estimate) the reproduction durability times at an arbitrary ambient temperature and/or an arbitrary reproducing laser power, from the determined relationship between the temperature of the recording layer and the reproduction durability times of the optical recording medium. The reproduction durability of the optical recording medium can be efficiently evaluated from the both viewpoints of the temperature of the use environment and the reproducing velocity (reproducing laser power). Therefore, in the method for evaluating the optical recording medium of the present invention, it is possible to easily evaluate the reproduction durability at any desired use environment with a high accuracy.

The evaluation parameter, which is to be used when the reproduction durability is determined, may include, for example, the jitter value, the error rate, the amplitude of the signal, S/N, and the asymmetry, from which any arbitrary threshold value may be established and used.

In general, in the case of the optical pickup using the semiconductor laser in relation to the reproducing laser power, the high frequency wave superimposing method, in which a high frequency current of several hundred MHz is superimposed on the driving current for the laser diode, is used as a technique for reducing the noise caused by the irregular returning light from the disk surface. However, the term "reproducing laser power" referred to in this specification means the average laser power as converted by calculation into the DC light emission.

The term "recording operating temperature" of the recording layer or the term "operating point temperature" described later on, as referred to in this specification means the minimum value of the temperature at which information can be recorded in the recording layer. For example, when the recording layer is formed of a phase-change recording material, the recording operating temperature (or the operating point temperature) of the recording layer is the melting point of the recording layer. When the recording layer is formed of a dye material, the recording operating temperature (or the operating point temperature) of the recording layer is the decomposition point of the recording layer. When the recording layer is formed of a magnetic material, the recording operating temperature (or the operating point temperature) of the recording layer is the Curie point of the recording layer.

In the method for evaluating the optical recording medium according to the present invention, a temperature Tr [° C.] which is the temperature of the recording layer during the data reproduction may be determined from the following relational expression:

$$Tr=(Pr \times (Tm-Tc)/Pm)+Tt \quad (1)$$

wherein Tm [° C.] represents the recording operating temperature of the recording layer, Pm [mW] represents the operating laser power, Tc [° C.] represents an ambient temperature when the operating laser power Pm is determined, Tt [° C.] represents the ambient temperature during the data reproduction, and Pr [mW] represents the reproducing laser power during the data reproduction.

An explanation will be made about the method for deriving the expression (1). When the optical recording medium is irradiated with the laser beam having the operating laser power Pm [mW] at a certain ambient temperature Tc [° C.], the temperature of the recording layer is raised from Tc [° C.] to Tm [° C.]. Therefore, the increase in the temperature of the recording layer per 1.0 [mW] of the laser power can be estimated to be (Tm−Tc)/Pm [° C./mW]. Therefore, when the optical recording medium is irradiated with the laser beam having the reproducing laser power Pr [mW] at the predetermined ambient temperature Tt [° C.] (during the data reproduction), the temperature Tr [° C.] of the recording layer can be estimated as follows:

$$Tr=\text{(increase in temperature by laser beam radiation)} + \text{(ambient temperature)}=(Pr \times (Tm-Tc)/Pm)+Tt \quad (1)$$

As clarified from the expression (1), the temperature Tr of the recording layer is the function of the reproducing laser power Pr and the ambient temperature Tt. Therefore, in the expression (1), the reproducing laser power Pr and the ambient temperature Tt are converted by calculation into the temperature of the recording layer. When any one of the reproducing laser power Pr and the ambient temperature Tt is constant value in the expression (1), the ambient temperature or the reproducing laser power is converted by calculation into the temperature of the recording layer. [0020] When the above expression (1) is used, the temperature of the recording layer, which is to be obtained when the laser beam is radiated during the data reproduction, can be easily estimated. When the Arrhenius plot is executed by using the value of the temperature of the recording layer and the reproduction durability times determined under the condition during the data reproduction, it is possible to determine the reproduction durability times at an arbitrary temperature of the recording layer. That is, when the expression (1) is used, it is possible to easily determine the reproduction durability times of the optical recording medium at an arbitrary ambient temperature Tt and/or an arbitrary reproducing laser power Pr.

In the method for evaluating the optical recording medium according to the present invention, the recording operating temperature of the recording layer may be a melting point of the recording layer. In this case, it is possible to evaluate the optical recording medium provided with the recording layer formed of the phase-change material. The melting point of the rewritable recording layer formed of the phase-change material differs depending on the material of the recording layer. However, according to the melting points of the respective constitutive materials (for example, about 631° C. of Sb, about 937° C. of Ge, about 725° C. of GeTe, and about 650° C. of $Bi_2Ge_3Te_6$) and the composition ratio of each of the elements for constructing the recording layer formed of the phase-change material, it is possible to make the following estimation. That is, the melting point of the recording layer composed of the material based on Ag—In—Sb—Te is about 600° C., the melting point of the recording layer composed of the material based on Ag—In—Ge—Sb—Te or Ge—Sb—Sn—Te is about 650° C., and the melting point of the recording layer composed of the material based on Bi—Ge—Te is about 700° C.

In the method for evaluating the optical recording medium according to the present invention, the recording operating temperature of the recording layer may be a decomposition point of the recording layer. In this case, it is possible to evaluate the optical recording medium provided with the recording layer formed of the dye material. The decomposition point of the write-once type recording layer formed of the dye material can be determined from the mass change with respect to the temperature by using a thermogravimetric/differential thermal analysis apparatus (TG/DTA). The decomposition point differs depending on the dye material. However, for example, the decomposition point of the azo-based dye material is about 300° C. It is known for the recording layer formed of the dye material that the state of the recording layer changes by the complex phenomena such as decomposition and sublimation. However, when an approximately linear relationship exists between the increase in the laser power and the increase in the temperature from the ordinary temperature to the decomposition point, the evaluation method of the present invention is especially effective.

In the method for evaluating the optical recording medium according to the present invention, the recording operating temperature of the recording layer may be a Curie point of the recording layer. In this case, it is possible to evaluate the optical recording medium provided with the magneto-optical recording layer. The Curie point differs depending on the composition of the recording layer. However, when the composition is TbFeCo, the Curie point is about 300° C.

In the method for evaluating the optical recording medium according to the present invention, the operating laser power may be determined from a change characteristic of a reflectance of the optical recording medium with respect to a laser power, and may be a laser power in which the reflectance of the optical recording medium begins to change in the change characteristic.

When the recording layer is formed of the phase-change material, the laser power (operating laser power: hereinafter referred to as "laser power corresponding to the recording operating temperature" as well), which is required to heat the recording layer to the melting point, can be determined from the change characteristic of the reflectance of the optical recording medium. In case the recording layer is formed of the phase-change material, when the temperature of the recording layer arrives at the melting point, then the characteristics of the recording layer is changed from the crystalline state to the amorphous state or from the amorphous state to the crystalline state. As a result, the reflection intensity of the optical recording medium, i.e., the reflectance is changed.

Therefore, when the optical recording medium is irradiated with the laser beam while gradually increasing the laser power to detect the change of the reflectance, and the laser power, at which the reflectance begins to change, is determined. Then the temperature of the recording layer, which is obtained when the laser power, at which the reflectance begins to change, is radiated, is considered to correspond to the melting point of the recording layer. The term "laser power" referred to herein means the average laser power when the conversion is made into the DC light emission, in the same manner as for the reproducing laser power.

When the recording layer is the recording layer formed of the dye material, the laser power, which corresponds to the decomposition point (recording operating temperature) of the recording layer, can be determined from the change characteristic of the reflectance of the optical recording medium. When the recording layer formed of the dye material is irradiated with the laser, then the dye absorbs the light to convert the light energy into the thermal energy, and the dye is decomposed to generate the gas. The substrate is thermally softened and deformed by the pressure of the generated gas. Accordingly, the phase difference of the light arises for the state before the dye is decomposed, and the reflection intensity of the light, i.e., the reflectance is changed. Therefore, when the optical recording medium is irradiated with the laser beam while gradually increasing the laser power to detect the change of the reflectance, and the laser power, at which the reflectance begins to change, is determined, then the temperature of the recording layer, which is obtained when the laser power, at which the reflectance begins to change, is radiated, is considered to correspond to the decomposition point of the recording layer.

In the method for evaluating the optical recording medium according to the present invention, the operating laser power may be determined from a change characteristic of a direction of magnetization of the optical recording medium with respect to the laser power, and may be a laser power in which the direction of magnetization of the optical recording medium begins to change in the change characteristic.

When the recording layer is the magneto-optical recording layer, the laser power, which corresponds to the Curie point (recording operating temperature) of the recording layer, can be determined from the change characteristic of the magnetization direction of the optical recording medium. In case the recording layer is the magneto-optical recording layer, the magnetization reversal is caused by the external magnetic field when the temperature of the recording layer arrives at the Curie point. Therefore, when the laser beam is radiated while gradually raising the laser power to detect the change of the magnetization direction in a state in which the external magnetic field is applied to the optical recording medium, and the laser power, at which the magnetization direction begins to change, is determined. Then the temperature of the recording layer, which is obtained when the laser power at which the magnetization direction begins to change is radiated, is considered to correspond to the Curie point of the recording layer. In general, the change of the magnetization direction can be detected by detecting the change of the electric signal by utilizing the fact that the polarization of the light is rotated by the magneto-optical effect depending on the magnetization direction of the recorded magnetic domain.

The phrase "laser power at which the reflectance of the optical recording medium begins to change" referred to in this specification means the laser power at the boundary between the laser power region which indicates the reflectance to be obtained when the recording layer resides in one characteristic and the laser power region which indicates the reflectance to be obtained when the recording layer resides in the other characteristic, in the change characteristic of the reflectance of the optical recording medium with respect to the laser power. The phrase "laser power at which the magnetization direction of the optical recording medium begins to change" referred to in this specification means the laser power at the boundary between the laser power region which corresponds to the state of the recording layer in one magnetization direction and the laser power region which corresponds to the state of the recording layer in the other magnetization direction, in relation to the change characteristic of the magnetization direction of the optical recording medium with respect to the laser power.

In the method for evaluating the optical recording medium according to the present invention, the operating laser power may be determined from a change characteristic of a reflectance or a direction of magnetization of the optical recording medium with respect to a laser power, and may be determined on the basis of a plurality of values of the reflectance or a plurality of values of the direction of magnetization in a laser power region of the change characteristic corresponding to a state in which the temperature of the recording layer is higher than the recording operating temperature. Accordingly, the laser power (operating laser power), which corresponds to the recording operating temperature of the recording layer, can be determined more correctly.

When the recording layer of the optical recording medium is formed of the phase-change material, the recrystallization occurs after the melting of the recording layer, even when the laser power of the laser beam radiated onto the recording layer arrives at the laser power to melt the recording layer. Therefore, it is difficult to definitely provide the laser power at which the reflectance begins to change. In such a situation, the laser power (operating laser power), which corresponds to the recording operating temperature of the recording layer, may be determined as follows.

At first, two or more points (a plurality of points of) reflectances are determined in the laser power region in which the reflectance is changed, for example, by 10% to 30% as compared with the reflectance at the laser power before the recording layer is melted and the change of the reflectance is clearly recognizable (definite change of the characteristics of the recording layer is recognizable). Then, an approximate expression, which satisfies the relationship between the laser power and the reflectance at the measuring points as described above, is determined. Subsequently, the laser power, at which the reflectance begins to change, is determined from the determined approximate expression. Specifically, for example, the laser power, which corresponds to the point of intersection between the straight line expressed by the approximate expression and the level of the reflectance in the laser power region before the recording layer is melted in the change characteristic of the reflectance, can be regarded as the laser power at which the reflectance begins to change. When this method is used, it is possible to more correctly determine the value of the laser power at which the change of the reflectance begins. Even when the recording layer of the optical recording medium is formed of the dye material, the operating laser power may be determined from the change characteristic of the reflectance in the same manner as in the case in which the recording layer is formed of the phase-change material.

When the recording layer of the optical recording medium is the magneto-optical recording layer, two or more points of characteristic values (electric signal levels) are determined in the laser power region in which the change of the magnetization direction is definitely recognizable (definite change of the magnetization direction of the recording layer is recognizable) in the change characteristic of the magnetization direction with respect to the laser power. Then, an approximate expression, which satisfies the relationship between the laser power and the characteristic value at the measuring points as described above, is determined. Subsequently, the laser power, at which the magnetization direction begins to change, is determined from the determined approximate expression. Specifically, for example, the laser power, which corresponds to the point of intersection between the straight line expressed by the approximate expression and the electric signal level in the laser power region before the recording layer is subjected to the magnetization reversal, can be regarded as the laser power at which the magnetization direction begins to change. When this method is used, it is possible to more correctly determine the value of the laser power at which the change of the magnetization direction begins.

According to a second aspect of the present invention, there is provided a method for evaluating reproduction durability of an optical recording medium which has a recording layer and from which information is reproduced by irradiation of a laser beam, the method comprising:

determining an operating laser power for heating the recording layer to an operating point temperature;

determining reproduction durability times at a plurality of reproducing laser powers respectively;

determining a temperature of the recording layer at each of the reproducing laser powers on the basis of each of the reproducing laser powers, an ambient temperature when the laser beam is radiated at each of the reproducing laser powers, and the operating laser power;

executing an Arrhenius plot on the basis of the temperatures of the recording layer and the reproduction durability times at the plurality of reproducing laser powers; and determining a reproduction durability times at least at one of a desired ambient temperature and a desired reproducing laser power, on the basis of a result of the Arrhenius plot.

The method for evaluating the optical recording medium according to the present invention may further comprise determining a maximum value of the reproducing laser power which is capable of guaranteeing the reproduction durability times at least at one of the desired ambient temperature and the desired reproducing laser power.

The method for evaluating the optical recording medium according to the present invention may further comprise determining the recording operating temperature (operating point temperature) of the recording layer. When the recording layer is formed of the phase-change material, the recording operating temperature (melting point) may be determined, for example, by investigating the endothermic or heat absorption peak involved in the melting of the recording layer material by using a differential thermal analysis apparatus such as a differential thermal balance. When the recording layer is formed the dye material, the recording operating temperature (decomposition point) may be determined, for example, from the change of the mass with respect to the temperature by using a thermogravimetric/differential thermal analysis apparatus (TG/DTA) as described above. When the recording layer is the magneto-optical recording layer, the recording operating temperature (Curie point) may be determined, for example, by investigating the temperature characteristic of the dielectric constant and/or the magnetization of the recording layer material by using, for example, a Curie point-measuring apparatus.

When the method for evaluating the optical recording medium as described above is used, the reproduction durability of the optical recording medium, which is provided at an arbitrary ambient temperature and/or an arbitrary reproducing power, can be accurately evaluated in a short period of time by means of the easily method.

According to a third aspect of the present invention, there is provided an optical recording medium comprising:

an information-recording section; and a control data section, wherein:

information, which relates to a maximum value of a reproducing laser power determined by the method for evaluating the optical recording medium according to the present invention, is previously recorded on the control data section. In the optical recording medium according to the present invention, information, which relates to a plurality of recording velocities, may be recorded on the optical recording medium, and the information, which relates to the maximum value of the reproducing laser power, may be recorded for each of the recording velocities.

The linear velocity is increased to be high when the optical recording medium is subjected to the high velocity recording and reproduction. Therefore, the mechanical noise, which is generated, for example, from the rotating section in the information-recording/reproducing apparatus, is increased. Usually, in order to supplement the deterioration of the address signal quality in relation to the position information caused by the increase in the noise, it is conceived that the address signal quality is improved such that the reproducing laser power, which is used when the address signal is read at a high linear velocity, is made higher than that used at a low linear velocity. However, when the reproducing laser power is excessively increased, it is feared that the signal quality of the information recorded on the optical recording medium may be deteriorated at an accelerated pace. However, in the case of the optical recording medium of the present invention, the maximum values of the reproducing laser power, which can guarantee the reproduction durability at the respective recording velocities, are previously recorded together with the value of the ordinary reproducing laser power. Therefore, the reproducing laser power, which is used to read the address signal at the high linear velocity, can be made to be not more than the maximum value of the reproducing laser power capable of guaranteeing the reproduction durability at each linear velocity, on the basis of the above information recorded on the optical recording medium. Thus, it is possible to guarantee the reproduction durability of the optical recording medium.

According to a fourth aspect of the present invention, there is provided an information-recording/reproducing apparatus which performs recording/reproducing information by irradiating an optical recording medium with a laser beam, wherein:

information about a maximum value of a reproducing laser power determined by the method for evaluating the optical recording medium according to the present invention, and information about a recording velocity provided when the maximum value of the reproducing laser power is determined are previously recorded on the optical recording medium, the information-recording/reproducing apparatus comprising:

an information-processing section which reads the information about the maximum value of the reproducing laser power and the information about the recording velocity; and a control section which sets the reproducing laser power during reproduction of information to be not more than the maximum value of the reproducing laser power, wherein:

the control section changes the reproducing laser power during the reproduction of information depending on the recording velocity.

In the information-recording/reproducing apparatus of the present invention, the quality of the address signal in relation to the position information for the recording and reproduction on the optical recording medium can be improved by increasing the reproducing laser power depending on the linear velocity during the recording and reproduction at a high velocity. Further, the reproducing laser power can be set to be not more than the reproducing laser power capable of being guaranteed by the optical recording medium. Therefore, according to the information-recording/reproducing apparatus of the present invention, the information can be reliably reproduced while avoiding the deterioration of the signal quality of the recording data on the optical recording medium even when the recording and reproduction are performed at the high velocity.

According to the method for evaluating the optical recording medium of the present invention, the reproduction durability times can be determined at an arbitrary ambient temperature and/or an arbitrary reproducing laser power from the relationship between the reproduction durability times and the temperature of the recording layer to be obtained when the laser beam is radiated during the data reproduction. Therefore, it is possible to highly accurately evaluate the reproduction durability of the optical recording medium in a desired use environment in a short period of time by means of the easily method.

In the optical recording medium on which the information about the maximum value of the reproducing laser power capable of guaranteeing the reproduction durability obtained by the evaluation method of the present invention, is previously recorded and the information-recording/reproducing apparatus for the optical recording medium, the reproducing laser power can be raised without deteriorating the quality of the recording signal of the optical recording medium, even when the information is recorded/reproduced at the high linear velocity. Further, it is possible to guarantee the reproduction durability.

BRIEF DESCRIPTION OF THE DRAWINGS

FIG. 11 shows a flow chart illustrating the operation of an information-recording/reproducing apparatus in a third embodiment.

DESCRIPTION OF THE PREFERRED EMBODIMENTS

An explanation will be specifically made below with reference to the drawings about embodiments of the method for evaluating the optical recording medium of the present invention. However, the present invention is not limited thereto.

First Embodiment

Optical Recording Medium

DVD-RAM of 4.7 GB was used as an optical recording medium to be used in the evaluation method of the first embodiment. The optical recording medium of this embodiment has such a structure that a first protective layer, a first interface layer, a recording layer, a second interface layer, a second protective layer, a heat absorption factor-correcting layer, and a heat-diffusing layer are stacked or laminated in this order on a substrate. The optical recording medium was manufactured as follows.

At first, the polycarbonate substrate having a diameter of 120 mm and a thickness of 0.6 mm was prepared, in which a guide groove having a track pitch of 1.2 μm and a groove depth of 63 nm was formed on the entire surface. Subsequently, the constitutive layers as described above were formed on the substrate by the sputtering process. Specifically, at first, $ZnS—SiO_2$ was formed to have a thickness of 100 nm as the first protective layer on the substrate. GeCrN was formed to have a thickness of 5 nm as the first interface layer on the first protective layer. Subsequently, BiGeTe was formed to have a thickness of 10 nm as the recording layer on the first interface layer. Subsequently, GeCrN was formed to have a thickness of 5 nm as the second interface layer on the recording layer. Further, $ZnS—SiO_2$ was formed to have a thickness of 50 nm as the second protective layer on the second interface layer. Subsequently, GeCr was formed to have a thickness of 50 nm as the heat absorption factor-correcting layer on the second protective layer. Finally, AgPdPt was formed to have a thickness of 100 nm as the heat-diffusing layer on the heat absorption factor-correcting layer. The optical recording medium used in this embodiment was obtained as described above. The entire surface of the optical recording medium obtained by the manufacturing method as described above was subjected to the crystallization (initialization) by using a laser initializing apparatus (not shown).

Information-Recording/Reproducing Apparatus

Figure 1:
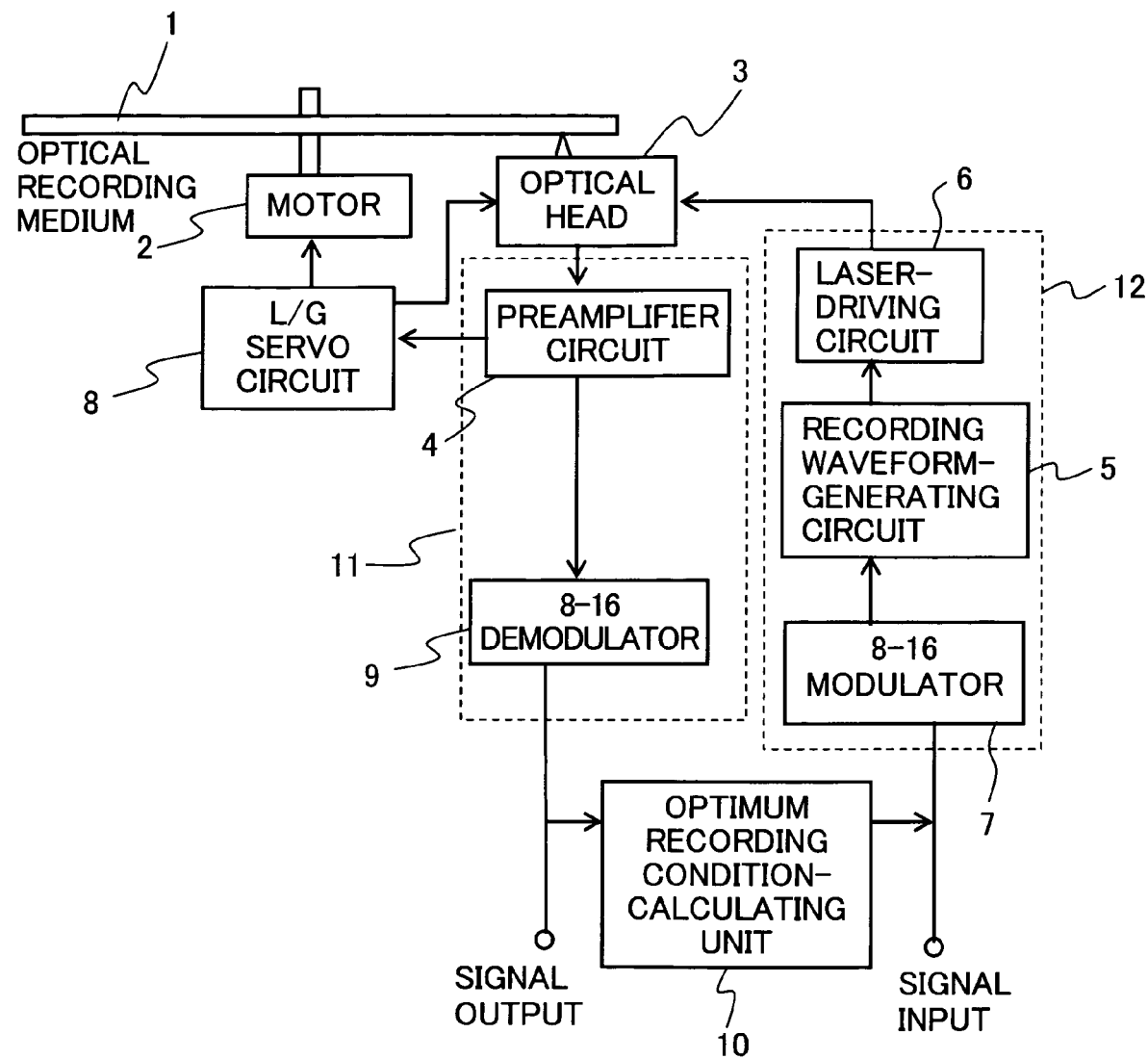
FIG. 1 shows a schematic view showing a construction of an information-recording/reproducing apparatus used to investigate the reproduction durability in a first embodiment.

Next, an explanation will be made about an information-recording/reproducing apparatus used to investigate the reproduction durability of the optical recording medium obtained by the manufacturing method as described above. FIG. 1 shows a schematic view showing a construction of the information-recording/reproducing apparatus.

As shown in FIG. 1, the information-recording/reproducing apparatus of this embodiment principally includes a motor 2 for rotating the optical recording medium 1 manufactured in this embodiment, an optical head 3 for irradiating the optical recording medium 1 with a laser beam, an L/G servo circuit 8 for performing the tracking control, a reproduced signal-processing system 11, a recording signal-processing system 11, and an optimum recording condition-calculating unit 10 for determining the optimum recording condition.

As shown in FIG. 1, the reproduced signal-processing system 11 includes a preamplifier circuit 4 for amplifying the reproduced signal, and an 8-16 demodulator 9 for decoding the information from the amplified reproduced signal. As shown in FIG. 1, the recording signal-processing system 12 includes an 8-16 modulator 7 for modulating the input signal in accordance with a predetermined modulation method, a recording waveform-generating circuit 5 for generating the recording signal waveform, and a laser-driving circuit 6 for controlling the light emission of the laser beam.

The optical head 3 used in this embodiment includes a semiconductor laser (not shown) having a wavelength of 655 nm as the laser beam for recording the information. The optical head 3 further includes an objective lens (not shown) having a numerical aperture NA of 0.6. In the optimum recording condition-calculating unit 10, the recording power and the length of the recording pulse between the marks are adjusted so that the thermal influence between the recording marks are excluded from the reproduced signal characteristic as much as possible, and the optimum recording condition is calculated so that the jitter and the error rate are minimized.

The information-recording/reproducing apparatus of this embodiment is adapted to the system (so-called the land-groove recording system) in which the information is recorded on both of the groove (G) and the land (L) (area between the grooves) of the optical recording medium 1. In the information-recording/reproducing apparatus of this embodiment, it is possible to arbitrarily select the tracking for the land and the groove by means of the L/G servo circuit 8.

Next, an explanation will be made about the operation of the information-recording/reproducing apparatus 100 used in this embodiment, i.e., the recording and reproduction processes. The recording process is as follows. At first, the information, in which 8 bits constitute one unit, is inputted into the 8-16 modulator 7 from the exterior of the information-recording/reproducing apparatus 100. In this embodiment, the modulation method for converting the 8-bit information into the 16-bit information, i.e., the so-called 8-16 modulation method is used when the information is recorded on the optical recording medium 1. In this modulation system, the recording marks having marks lengths of 3T to 14T, which are allowed to correspond to the 8-bit information, are formed on the optical recording medium 1 to record the information. The 8-16 modulator 7 shown in FIG. 1 performs the modulation as described above. The symbol "T" herein represents the clock length of the data upon the information recording. In this embodiment, T=5.7 nsec is given under the condition of the recording linear velocity of 24.6 m/sec.

Subsequently, the digital signal of 3T to 14T, which is converted by the 8-16 modulator 7, is inputted into the recording waveform-generating circuit 5. In this procedure, the optimum recording condition, which is determined by the optimum recording condition-calculating unit 10, is also inputted into the recording waveform-generating circuit 5 via the 8-16 modulator 7. The recording waveform is generated by the recording waveform-generating circuit 5 on the basis of the optimum recording condition. Subsequently, the recording waveform, which is generated by the recording waveform-generating circuit 5, is inputted into the laser-driving circuit 6. The laser-driving circuit 6 performs the light emission of the semiconductor laser contained in the optical head 3 on the basis of the recording waveform. The laser beam is focused onto the recording layer of the optical recording medium 1 by means of the objective lens contained in the optical head 3. The laser beam, which corresponds to the recording waveform, is radiated to record the information. When the recording is performed on the optical recording medium 1 under the recording condition as described above, then the mark length of the 3T mark as the shortest mark is about 0.42 µm, and the mark length of the 14T mark as the longest mark is about 1.96 µm.

Next, an explanation will be made about the reproduction process. The information, which is recorded on the optical recording medium 1 as described above, is reproduced by using the optical head 3 as well. The reproduced signal is obtained by irradiating the recorded mark with the laser beam, and detecting the reflected light beams from the mark and the portion other than the mark. The amplitude of the obtained reproduced signal is amplified by the preamplifier circuit 4. The amplified reproduced signal is thereafter inputted into the 8-16 demodulator 9. In the 8-16 demodulator 9, the information, which is obtained for every 16 bits, is converted into the 8-bit information. According to the operation as described above, the reproduction of the recorded mark is completed.

Method for Evaluating Reproduction Durability of Optical Recording Medium

In this embodiment, the reproduction durability of the optical recording medium was evaluated by determining the reproduction durability times at an arbitrary ambient temperature and/or a reproducing laser power. In this embodiment, the jitter value was used as an index for evaluating the reproduction durability (determining the reproduction durability times) of the optical recording medium. Therefore, an explanation will be made about a method for measuring the jitter value before explaining the method for evaluating the optical recording medium of this embodiment.

At first, the random pattern signal including 3T to 14T was recorded and reproduced on the optical recording medium of this embodiment. Subsequently, the reproduced signal of the recorded information was detected. The reproduced signal was subjected to the processing of the waveform equivalence, the binary conversion, and PLL (Phase Locked Loop) to measure the jitter value. In this procedure, the signal was reproduced under a constant condition of a linear velocity of 8.2 m/sec.

The cross-erase jitter was evaluated as the jitter. Specifically, the evaluation was performed as follows. At first, the random pattern was recorded ten times on a predetermined track (rewriting was performed). Subsequently, the random pattern was recorded ten times sequentially from the inner circumference to the outer circumference on the adjoining tracks disposed both adjacent sides of the predetermined track and on the tracks positioned on the sides of the adjoining tracks opposite to the predetermined track. After that, the jitter value was measured on the center track (predetermined track described above) of the five tracks on which the random pattern had been recorded. In this embodiment, the groove was used as the center track (predetermined track described above) of the five tracks.

Next, an explanation will be made with reference to FIG. 2 about the method for evaluating the reproduction durability of the optical recording medium of this embodiment. The evaluation method of this embodiment principally includes the following Steps A to C which are carried out in this order.

Figure 2:
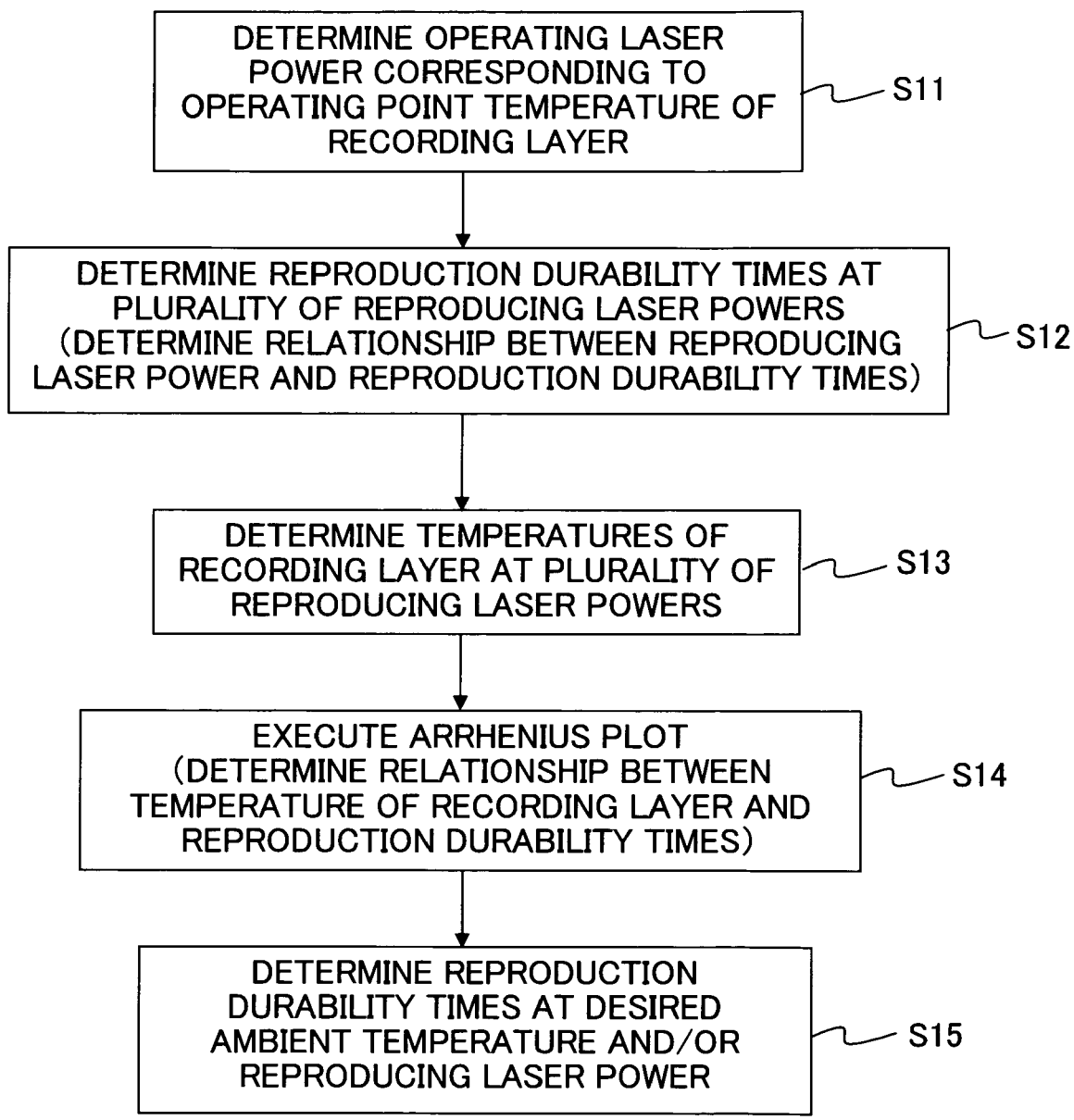
FIG. 2 shows a flow chart illustrating a method for evaluating the reproduction durability of an optical recording medium in the first embodiment.

(A) Step of determining the laser power corresponding to the operating point temperature of the recording layer (laser power required to heat the recording layer to the operating point temperature) (Step S11 shown in FIG. 2).

(B) Step of determining the reproduction durability times by changing the reproducing laser power (Step S12 shown in FIG. 2 : Step of determining a relationship between the reproducing laser power during the data reproduction and the reproduction durability times at the reproducing laser power).

(C) Step of converting the reproducing laser power into the temperature of the recording layer to determine the reproduction durability times at a desired ambient temperature and/or a desired reproducing laser power (desired environment of use) by executing the Arrhenius plot by using the determined temperature of the recording layer and the reproduction durability times which is determined in Step 12 (Steps S13 to S15 shown in FIG. 2).

At first, an explanation will be made about Step A (Step S11 shown in FIG. 2). In this embodiment, the operating point temperature of the recording layer is the melting point of the recording layer, because the phase-change type recording layer (BiGeTe) is used as the recording layer of the optical recording medium.

At first, in Step A, the minimum voltage value Iotmin1 [mV] of the reflectance level Iot is investigated in the initial state of the optical recording medium (state in which any recording is not performed) by using an oscilloscope. The symbol "Iot" referred to herein is the reflected light level of the groove (land, groove) observed with the sum signal. Subsequently, the optical recording medium is irradiated with the laser beam having the recording laser power Pw [mW] at a constant level of the DC light emission to perform the recording. Subsequently, the optical recording medium, on which the recording has been performed, is irradiated with the laser beam to detect the reflectance level. The minimum voltage value thereof Iotmin2 [mV] is investigated by using the oscilloscope. The reflectance change amount a at the recording laser power Pw [mW] is determined by using the following definition expression.

$$\alpha = (Iotmin2)/(Iotmin1) \quad (2)$$

Subsequently, the reflectance change amount α was determined while changing the recording laser power to measure the dependency of the reflectance change amount α on the recording laser power Pw. In this procedure, the reflectance change amount α was investigated while changing the track to be irradiated with the laser beam for every recording laser power. As a result, the reflectance change amount α is constant in the region in which the recording laser power is small, while the reflectance change amount α begins to change from the constant value when the recording laser power is increased. The region, in which the reflectance change amount α begins to change, is the region in which the characteristics of the recording layer begins to change. In the case of the recording layer formed of the phase-change material as the recording layer used in this embodiment, the region is such a region that the state of the recording layer begins to change from the crystalline state to the amorphous state. That is, in the dependency of the reflectance change amount α on the recording laser power Pw (change characteristic of the reflectance), the recording laser power Pw at the boundary of the start of the change of the reflectance change amount α is the laser power corresponding to the melting point (operating point temperature) of the recording layer (laser power required to heat the recording layer to the melting point). The initial state of the recording layer is the crystalline state, because the recording layer, which is used in this embodiment, is the phase-change film. However, when the recording layer is coagulated after the recording layer is once melted, the state of the recording layer is changed to the amorphous state. Therefore, the reflectance is changed after the characteristics is changed.

The reason, why the minimum voltage value Iotmin1 [mV] of the reflectance level in the initial state is used as the reference in the expression (2) described above, is that it is intended to consider the variation of the reflectance brought about in the circumferential direction or in the radial direction of the disk due to the beam shape upon the initialization, and the variation of the reflectance in the initial state in each of the tracks.

Figure 3:
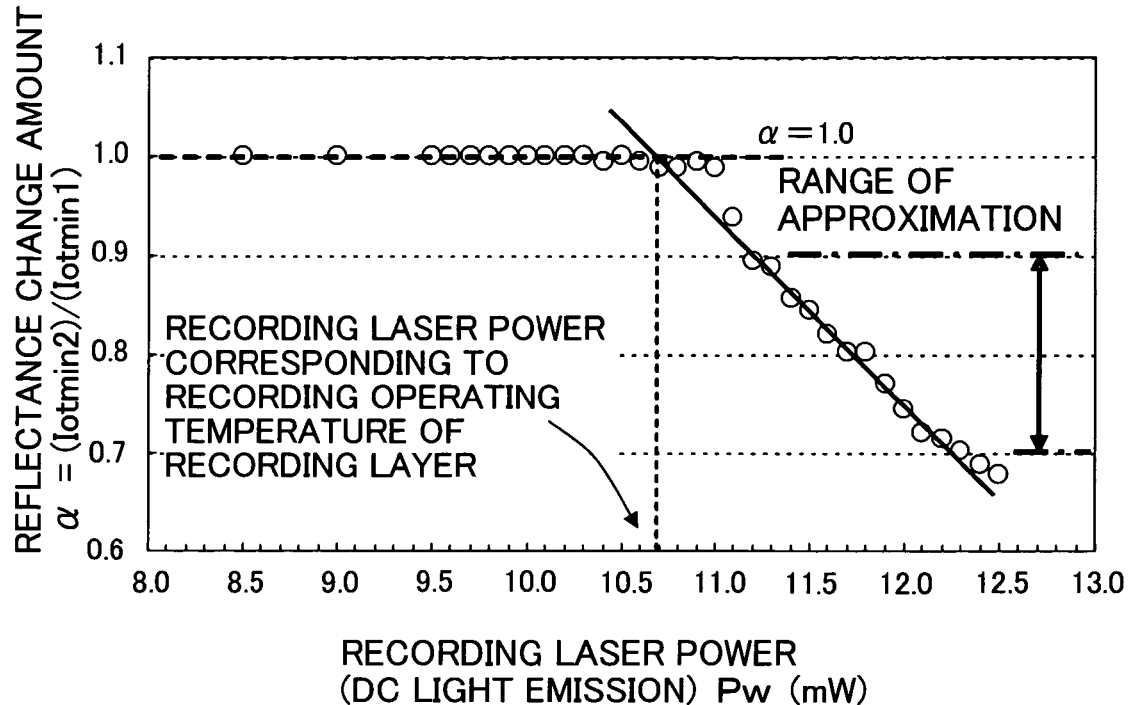
FIG. 3 illustrates a technique for determining the laser power corresponding to the recording operating temperature of the recording layer from the relationship between the laser power and the reflectance change as measured in the first embodiment.

In this embodiment, the change of the reflectance change amount α was investigated by actually changing the recording laser power of the DC light emission from 8.5 mW to 12.5 mW under a condition of linear velocity of 24.6 m/sec. An obtained result is shown in FIG. 3. As shown in FIG. 3, the reflectance change amount α (reflectance) begins to change in a range in which the recording laser power Pw is from 10.5 mW to 11.0 mW. However, the reflectance is actually varied in this recording power region, because the recrystallization occurs after the recording layer is melted. Therefore, it is difficult to determinately define the recording laser power Pw at which the reflectance begins to change.

Accordingly, in the dependency of the reflectance change amount α on the recording laser power Pw shown in FIG. 3, the linear approximation was performed by using the result of the measurement in the region of the recording laser power Pw in which the characteristics of the recording layer was definitely changed (to be in the amorphous state) from the initial state (crystalline state) to determine the recording laser power Pw at which the reflectance began to change. Specifically, as shown in FIG. 3, the linear approximation was performed (thick solid line shown in FIG. 3) by using the measuring points in the recording laser power region in which the reflectance change amount α was within a range from 0.90 to 0.70. The point, at which a line of the linear approximation intersected a line of the reflectance change amount α=1.0 (thick broken line shown in FIG. 3, the reflectance change amount α in the initial state), was regarded as the boundary point at which the reflectance began to change, i.e., the melting point which was the recording operating temperature of the recording layer. When the estimation method was used as described above, the recording laser power, at which the reflectance began to change, was 10.7 mW in this embodiment. Therefore, the recording laser power of 10.7 mW, at which the reflectance begins to change as determined by the linear approximation as described above, is the recording laser power Pm corresponding to 700° C. (melting point), because the melting point Tm of the recording layer used in this embodiment is about 700° C. Step A (Step S11 shown in FIG. 2) was carried out as described above. The test environment temperature Tc (ambient temperature) around the optical recording medium was Tc=25° C. when Step A was carried out as described above.

Next, an explanation will be made about Step B (Step S12 shown in FIG. 2). In this embodiment, the value of the cross-erase jitter=12% was used as the judgment reference for the reproduction durability, and the number of times of reproduction, at which the cross-erase jitter was 12% when a certain reproducing laser power was continuously radiated, was regarded as the reproduction durability times at the certain reproducing laser power. The basis of the judgment reference for the reproduction durability of the cross-erase jitter=12 is as follows. That is, in general, it is feared that the information cannot be reproduced with the drive when the cross-erase jitter exceeds 12%.

In Step B, at first, the reproducing laser power was set to 1.0 mW under a condition of the linear velocity of 24.6 m/sec (6× velocity) (number of revolutions of 4,544 rpm at a position of radius r=51.7 mm). Subsequently, the random pattern was recorded (rewritten) ten times on a predetermined track. Subsequently, the random pattern was recorded ten times (cross-erase writing was performed) sequentially from the inner circumference to the outer circumference on the adjoining tracks disposed both adjacent sides of the predetermined track and on the tracks positioned on the sides of the adjoining tracks opposite to the predetermined track. The random pattern was recorded by regulating the recording laser power so that the jitter was minimized after the cross-erase writing.

Subsequently, after the reproducing laser power was raised to 2.9 mW, the reproduction was performed for a predetermined period of time on the center track (predetermined track described above) of the five tracks on which the cross-erase writing had been performed. Then, the reproducing laser power was lowered to 1.0 mW again. After that, the linear velocity was set to a condition of 8.2 m/sec (number of revolutions: 1,515 rpm) to measure the jitter value. The measurement of the jitter value was repeated until the jitter value exceeded 12%. The reason, why the linear velocity was lowered from 24.6 m/sec to 8.2 m/sec when the jitter value was measured, is as follows. That is, in the characteristic of PLL used in this embodiment, the jitter can be stably evaluated when the reproduction is performed at the linear velocity of 8.2 m/sec.

A format of the optical recording medium in this embodiment is the DVD-RAM format. Therefore, the track includes the land and the groove. However, in the measurement of the jitter as described above, the groove was used as the center track (predetermined track described above) of the above five tracks. The jitter was measured at a test environment temperature of 25° C.

Figure 4:
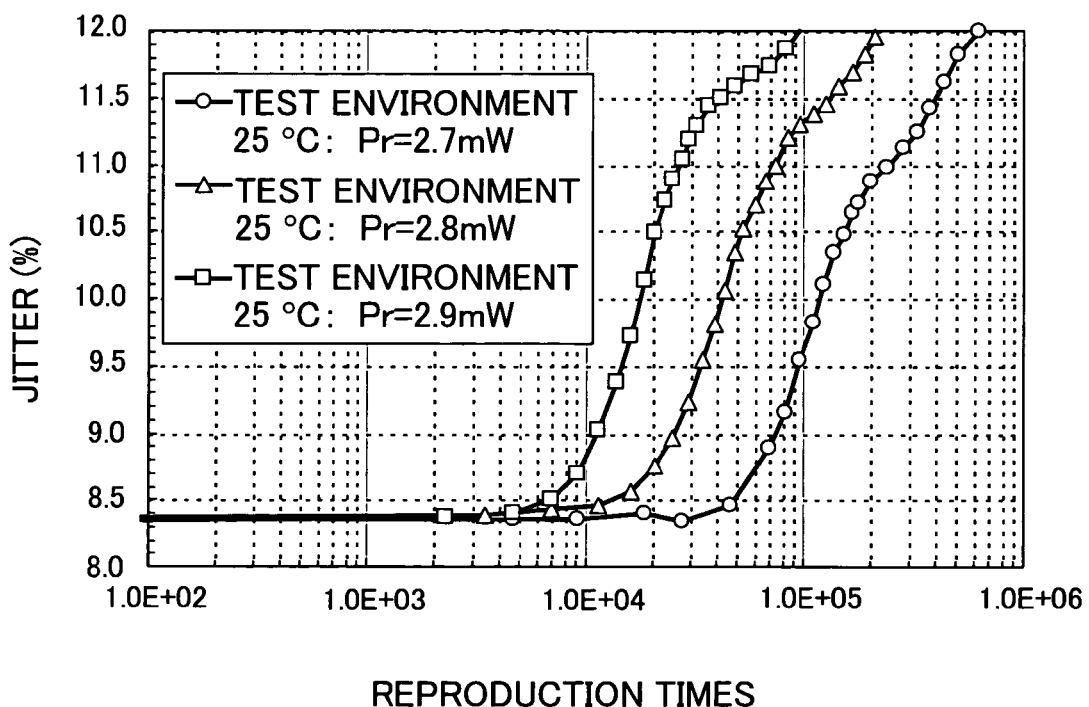
FIG. 4 shows the relationship between the jitter and the number of times of reproduction at a test environment temperature of 25° C. as measured in the first embodiment.

The jitter was measured under the condition of the reproducing laser power Pr of 2.9 mW, 2.8 mW, and 2.7 mW. An obtained result (relationship between the number of times of reproduction and the jitter value) is shown in FIG. 4. In FIG. 4, the horizontal axis logarithmically represents the number of times of reproduction, and the vertical axis represents the jitter value. The number of times of reproduction was determined by the multiplication of the time and the number of revolutions of 4,544 rpm per 1 minute during the reproduction. According to the result shown in FIG. 4, when the reproducing laser power Pr was set to 2.9 mW, 2.8 mW, and 2.7 mW, the reproduction durability times, at which the jitter value was 12%, was 96,500 times, 211,000 times, and 620,000 times respectively. Step B (Step S12 shown in FIG. 2) was carried out as described above.

Next, an explanation will be made about Step C (Steps S13 to S15 shown in FIG. 2). In Step C, at first, the temperature Tr [° C.] of the recording layer, which is to be obtained when the laser beam having a certain reproducing laser power Pr [mW] is radiated at a certain test environment temperature (ambient temperature) Tt [° C.], is determined according to the following expression (Step S13 shown in FIG. 2) by using the recording operating temperature Tm (700° C. in this embodiment) of the recording layer at the predetermined test environment temperature Tc (25° C. in this embodiment) and the laser power Pm (10.7 mW in this embodiment) corresponding to the recording operating temperature Tm determined in Step A as described above.

$$Tr=(Pr\times(Tm-Tc)/Pm)+Tt \quad (1)$$

In the expression (1), the temperature increase of the recording layer per 1.0 mW of the reproducing laser power is calculated as (Tm−Tc)/Pm [° C./mW] on the basis of the concept that the laser power Pm corresponds to the recording operating temperature Tm of the recording layer at the predetermined ambient temperature Tc. Therefore, when the temperature of the test environment (around the disk) is Tt [° C.], the temperature Tr of the recording layer, which is to be obtained when the optical recording medium is irradiated with the reproducing laser power Pr [mW] during the reproduction, is Pr x (temperature increase of recording layer per 1 mW of laser power)+(ambient temperature Tt). Thus, the expression (1) described above is obtained.

In this embodiment, according to Step A, the laser power Pm, which corresponds to the recording operating temperature (melting point) Tm=700° C. of the recording layer at the surrounding test environment temperature Tc=25° C., is 10.7 mW. Therefore, the temperature Tr [° C.] of the recording layer, which is to be obtained when the optical recording medium is irradiated with the reproducing laser power Pr=2.9 mW during the information reproduction in the environment at the ambient temperature Tc=Tt=25° C., is estimate as follows.

$$Tr=(2.9\times(700-25)/10.7)+25=207.94 \text{ [° C.]}$$

When the temperature Tr of the recording layer, which is to be obtained when the optical recording medium is irradiated with the laser beam at reproducing laser powers Pr=2.8 mW and 2.7 mW in the environment of the ambient temperature Tc=Tt=25° C., is determined in the same manner as in the estimation method as described above, the values are 201.64° C. and 195.33° C. respectively. When the estimation method as described above is used, it is possible to estimate the temperature of the recording layer to be obtained when an arbitrary reproducing laser power is radiated at an arbitrary ambient temperature (test environment temperature). That is, the ambient temperature and/or the reproducing laser power can be converted by calculation into the temperature of the recording layer. In Step C in this embodiment, the reproducing laser power is changed from 2.7 to 2.9 mW while the ambient temperature is constant at 25° C. as described above. Therefore, the reproducing laser power is consequently converted by calculation into the temperature of the recording layer.

Subsequently, the Arrhenius plot was executed by using the reproduction durability times at the reproducing laser powers Pr=2.7, 2.8, and 2.9 mW determined in Step B and the temperatures of the recording layer at each of the reproducing laser powers Pr determined by means of the estimation method as described above (Step S14 shown in FIG. 2: Step of determining a relationship between the temperature of the recording layer and the reproduction durability times). The Arrhenius plot represents the relationship in which the logarithmic value of the reaction velocity is proportional to the reciprocal or the inverse number (1/T) of the absolute temperature T. The relationship between the temperature Tr [° C.] and the absolute temperature T [K] is T [K]=Tr [° C.]+273.15. The recording layer formed of the phase-change material is used in the optical recording medium of this embodiment. Therefore, the reproduction durability times is based on the change (chemical change) of the characteristics of the recording layer. Accordingly, in the optical recording medium of this embodiment, the Arrhenius relational expression also holds between the logarithmic value of the reproduction durability times and the reciprocal of the temperature of the recording layer. That is, the relationship is provided such that the logarithmic value of the reproduction durability times is proportional to the reciprocal of the temperature of the recording layer. This fact will be explained more specifically below.

Table 1 indicates the reproducing laser power Pr, the temperature Tr of the recording layer, 1,000/T, and the reproduction durability times at the test environment temperature of 25° C. as determined by the estimation method for the temperature of the recording layer and Steps A and B. The converted temperature shown in Table 1 means the temperature Tr of the recording layer determined in accordance with the expression (1). The converted absolute temperature T has the value obtained by converting the converted temperature Tr into the absolute temperature.

TABLE 1

| | | | |
|---|---|---|---|
| Reproducing power Pr [mW] | 2.7 | 2.8 | 2.9 |
| Converted temperature Tr [° C.] | 195.33 | 201.64 | 207.94 |
| Converted absolute temperature T [K] | 468.48 | 474.79 | 481.09 |
| 1,000/T | 2.1346 | 2.106 | 2.079 |
| Reproduction durability times | 620,000 | 211,000 | 96,500 |

Figure 5:
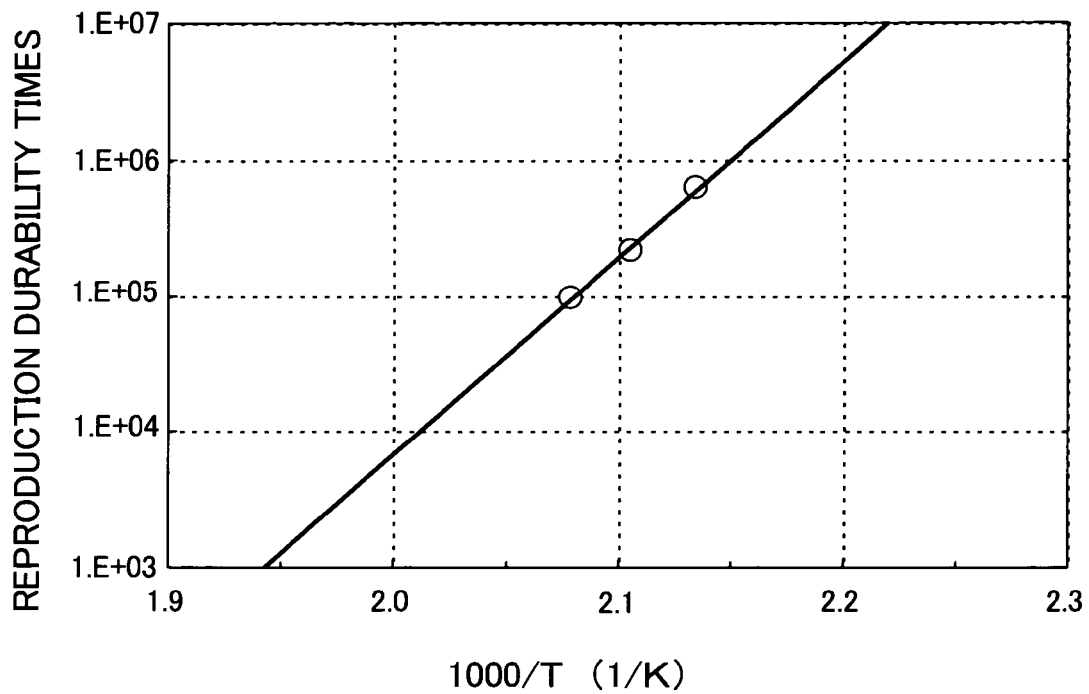
FIG. 5 shows a result of the Arrhenius plot executed in the first embodiment.

The Arrhenius plot was executed by using the result shown in Table 1. An obtained result is shown in FIG. 5. In FIG. 5, the horizontal axis represents 1,000/T, and the vertical axis represents the logarithm of the reproduction durability times. As clarified from FIG. 5, the proportional relationship is obtained between 1,000/T and the logarithm of the reproduction durability times. Therefore, this plot is represented with in a straight line. According to this fact, it is appreciated that the value of 1,000/T is correlated with the reproduction durability times extremely strongly.

When the exponential approximation is made for the relationship between 1,000/T and the reproduction durability, the following relational expression is derived.

(reproduction durability times)=9.08×10$E$−26×exp (33.24× (1,000/$T$))

For example, based on this expression, the value of 1,000/T, which satisfies a reproduction durability times of one million times, is determined as follows.

(1,000/$T$)=ln[10$E$+6/(9.08×10$E$−26)]/33.24=2.1503

Therefore, the temperature Tr of the recording layer in this situation is as follows.

$Tr=T$−273.15=1,000/2.1503−273.15=191.90 [° C.]

According to this fact, in the optical recording medium of this embodiment, it is appreciated that the reproduction durability times of one million times can be guaranteed by performing the reproduction under the condition in which the temperature Tr of the recording layer is not more than 191.90° C.

As described above, in the method for evaluating the optical recording medium according to the present invention, the reproduction durability times at an arbitrary temperature of the recording layer can be determined by executing the Arrhenius plot by using the temperature of the recording layer and the reproduction durability times determined at the predetermined ambient temperature. In addition, in the method for evaluating the optical recording medium according to the present invention, as described above, the ambient temperature and/or the reproducing laser power is converted into the temperature of the recording layer. Therefore, it is possible to determine the reproduction durability times at an arbitrary ambient temperature and/or an arbitrary reproducing laser power from the Arrhenius plot (Step S15 shown in FIG. 2). That is, it is possible to evaluate the reproduction durability of the optical recording medium in a desired environment of use. In this embodiment, Step C was carried out as described above.

Next, an explanation will be made about a method for determining the condition of the reproducing laser power required to satisfy the reproduction durability times of one million times at an arbitrary ambient temperature (maximum value of the reproducing laser power capable of guaranteeing the reproduction durability times of one million times) on the basis of the result as described above.

At first, the maximum value of the reproducing laser power capable of guaranteeing the reproduction durability times of one million times is determined in a test environment of 60° C. on the basis of the result as described above. As described above, in order to guarantee the reproduction durability times of one million times in the test environment of 60° C. as well, it is necessary that the temperature of the recording layer is set to be not more than 191.90° C. Assuming that Pr1 [mW] represents the reproducing laser power to set the temperature of the recording layer to be 191.90° C. in the test environment of 60° C., the following expression is derived from the expression (1).

191.90=($Pr$1×(700−25)/10.7)+60

According to this expression, Pr1 is determined as follows.

$Pr$1=((191.90−60)×10.7)/(700−25)=2.09 [mW]

That is, according to this result, when the optical recording medium manufactured in this embodiment is subjected to the reproduction in the environment of the ambient temperature of 60° C. at the linear velocity of 24.6 m/sec, it is necessary that the reproducing laser power is not more than 2.09 [mW] in order to guarantee the reproduction durability times of not less than one million times.

Subsequently, the reproducing laser power Pr2, which is capable of guaranteeing the reproduction durability times of one million times in the environment of the ambient temperature of 25° C., is determined inversely from the laser power Pr1 which is capable of guaranteeing the reproduction durability times of one million times in the environment of the ambient temperature of 60° C. determined in accordance with the method as described above. This is achieved by calculating the value of the reproducing laser power Pr2 in the environment of the ambient temperature of 25° C. required to obtain the same temperature of the recording layer as that obtained when the reproducing laser power Pr1=2.09 [mW] is radiated in the environment of the ambient temperature of 60° C. Specifically, the value is determined according to the following relational expression by using the expression (1).

(2.90×(700−25)/10.7)+60=($Pr$2×(700−25)/10.7)+25

According to the expression described above, Pr2=2.64 [mW] is given. That is, the temperature of the recording layer, which is obtained when the reproducing laser power of 2.09 [mW] is radiated at the test environment temperature of 60° C., is equal to the temperature of the recording layer which is obtained when the reproducing laser power of 2.64 [mW] is radiated at the test environment temperature of 25° C.

According to the result of the calculation described above, the following fact is appreciated. When the information is reproduced under the condition in which the ambient temperature is not more than 60° C. and the linear velocity is 24.6 m/sec, on the optical recording medium (DVD-RAM) of this embodiment, the value of the maximum reproducing laser power (maximum allowable reproducing laser power) in order to guarantee the reproduction durability times, in which the jitter is not more than 12%, to be not less than one million times, is 2.09 mW. When the method as described above is used, it is possible to determine the maximum allowable reproducing laser power capable of guaranteeing the reproduction durability times of one million times at a desired ambient temperature.

Verification of Evaluation Method of Present Invention

In order to verify the accuracy of the result (calculation result) obtained by the evaluation method of this embodiment as explained above, the reproduction durability tests (hereinafter referred to as "first to third verification tests" as well) were actually performed for the optical recording medium under three types of environments described below. In the verification tests, the information-recording/reproducing apparatus shown in FIG. 1 was used.

Figure 6:
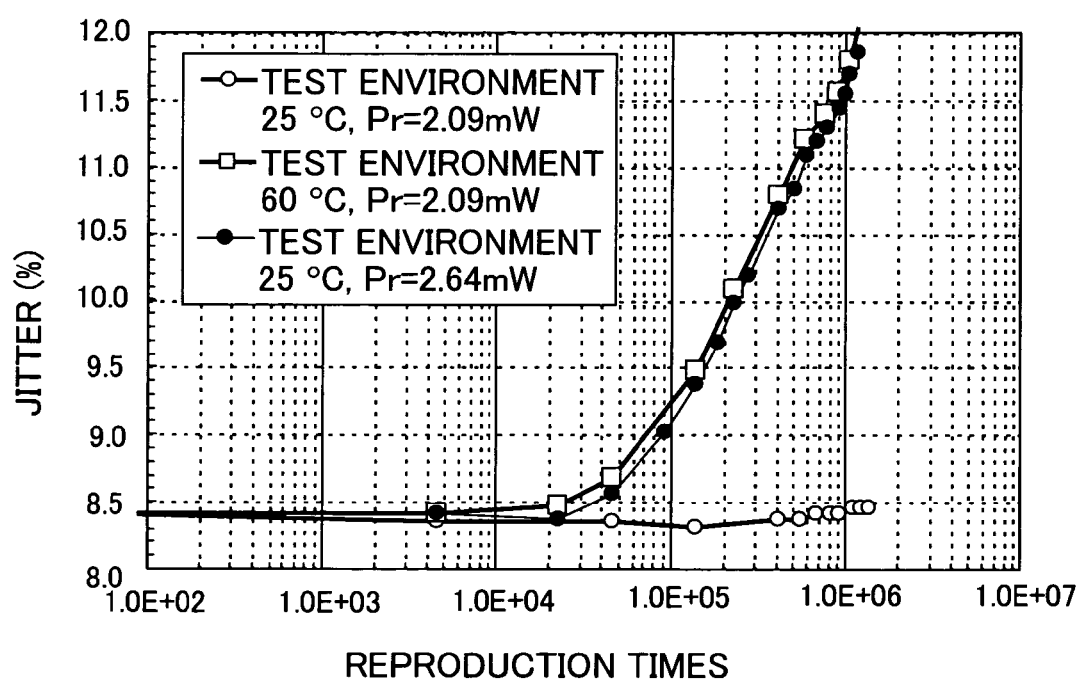
FIG. 6 shows the relationship between the jitter and the number of times of reproduction at test environment temperatures of 25° C. and 60° C. as measured in the first embodiment.

In the first verification test, the reproducing laser power was set to 2.09 [mW] in a state of the test environment temperature of 25° C. to investigate the relationship between the jitter and the number of times of reproduction. In the second verification test, the reproducing laser power was set to 2.64 [mW] in a state of the test environment temperature of 25° C. to investigate the relationship between the jitter and the number of times of reproduction. In the third verification test, the reproducing laser power was set to 2.09 [mW] in a state in which the test environment temperature was maintained at 60° C. by allowing the warm air to blow against the information-recording/reproducing apparatus to investigate the relationship between the jitter and the number of times of reproduction. Obtained results are shown in FIG. 6. In FIG. 6, the horizontal axis represents the logarithm of the number of times of reproduction, and the vertical axis represents the jitter. The characteristic indicated by outline circles in FIG. 6 represents the result of the first verification test. The characteristic indicated by filled circles represents the result of the second verification test. The characteristic indicated by outline squares represents the result of the third verification test.

As clarified from FIG. 6, the following fact is appreciated when the result of the first verification test (characteristic shown by the outline circles in FIG. 6) is compared with the result of the second verification test (characteristic shown by the filled circles in FIG. 6). That is, even when the reproducing laser power Pr is identical, in the case that the test environment temperature differs (25° C. and 60° C.), the reproduction durability greatly differs. According to this fact, the following fact is appreciated. That is, it is important to consider the temperature dependency of the reproduction durability as in the evaluation method of the present invention when the reproduction durability of the optical recording medium is evaluated, and it is impossible to correctly evaluate the reproduction durability by the evaluation method for the reproduction durability in which the temperature dependency is not considered (for example, the evaluation method as described in Japanese Patent Application Laid-open No. 2003-006941).

According to the result of the third verification test (characteristic shown by the outline squares in FIG. 6), the jitter was about 11.8% when the reproduction was performed one million times at the reproducing laser power of 2.09 [mW] in the state of the test environment temperature of 60° C. This result was approximately consistent with the result derived by using the evaluation method (Steps A to C) of this embodiment based on the experimental result obtained at the test environment temperature of 25° C. described above (FIG. 4), i.e., the result in which the reproduction durability times for allowing the jitter to be 12% was to be one million times when the reproduction was performed under the condition of the ambient temperature of 60° C. and the reproducing laser power of 2.09 [mW].

When the result of the second verification test is compared with the result of the third verification test, the following fact is appreciated as clarified from FIG. 6. That is, approximately the same characteristic is obtained, and the temperature of the recording layer during the reproduction is approximately the same in the second verification test and the third verification test. That is, the result has been obtained, which is approximately consistent with the result derived by the evaluation method of this embodiment described above (Steps A to C), i.e., the result in which the temperature of the recording layer, which is obtained when the reproducing laser power of 2.09 [mW] is radiated at the test environment temperature of 60° C., is equal to the temperature of the recording layer which is obtained when the reproducing laser power of 2.64 [mW] is radiated at the test environment temperature of 25° C.

As described above, the result of the evaluation of the reproduction durability, which is determined by the evaluation method considered the temperature dependency of the reproduction durability of this embodiment, is approximately equal to the result of the actual measurement of the reproduction durability obtained in the verification tests. Therefore, it is appreciated that the reproduction durability of the optical recording medium can be evaluated highly accurately in a short period of time by using the method for evaluating the optical recording medium of this embodiment.

The first embodiment is illustrative of the case in which, in order to execute the Arrhenius plot, the temperature of the recording layer and the reproduction durability times are determined by changing the reproducing laser power (2.7 mW to 2.9 mW, see Table 1) under the condition in which the test environment temperature (ambient temperature) is constant (25° C.), i.e., the case in which the reproducing laser power is converted by calculation into the temperature of the recording layer. However, the present invention is not limited thereto. The temperature of the recording layer and the reproduction durability times may be determined by changing the ambient temperature under a condition in which the reproducing laser power is constant to execute the Arrhenius plot. That is, the ambient temperature may be converted by calculation into the temperature of the recording layer to evaluate the reproduction durability. Alternatively, both of the ambient temperature and the reproducing laser power may be changed to determine the temperature of the recording layer and the reproduction durability times, and the Arrhenius plot may be executed. That is, the ambient temperature and the reproducing laser power may be converted by calculation into the temperature of the recording layer to evaluate the reproduction durability.

Modified Embodiment

Figure 7:
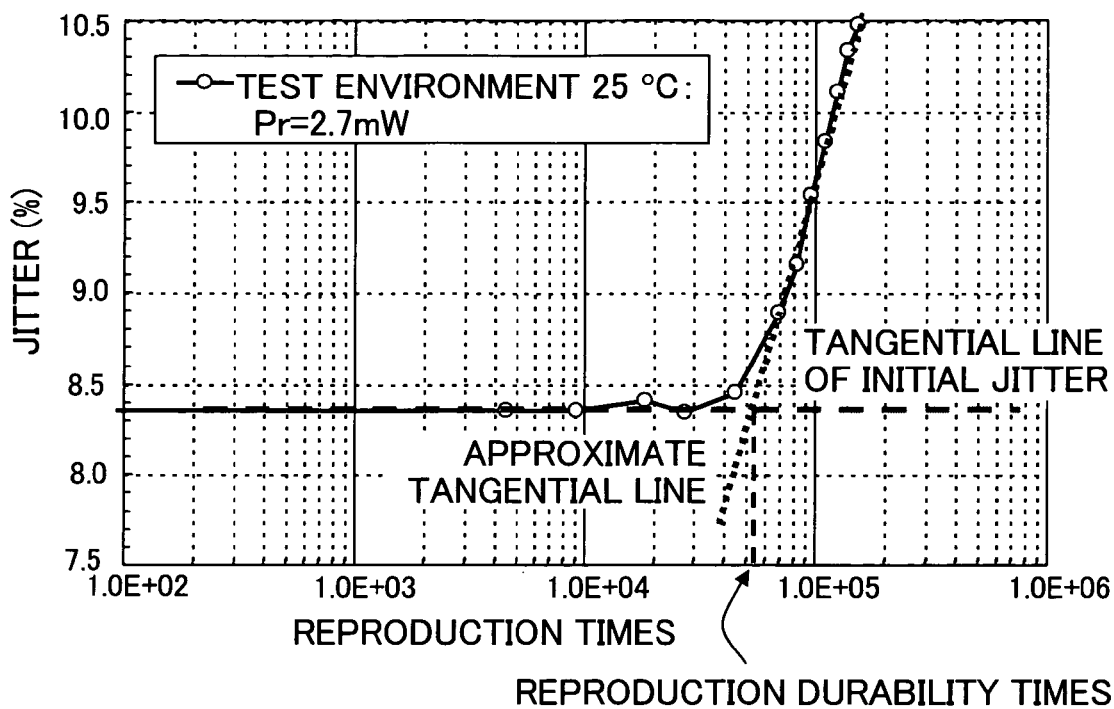
FIG. 7 illustrates the way of determining the reproduction durability times of the optical recording medium in a modified embodiment.

In the first embodiment, the jitter characteristic is used to evaluate the reproduction durability of the optical recording medium, and the number of times of reproduction, at which the cross-erase jitter is 12%, is regarded as the reproduction durability times. However, the present invention is not limited thereto. For example, as another criterion or standard which is more stringent than the criterion or standard of the first embodiment, it is also allowable that the number of times of reproduction, which is to be obtained when the jitter begins to increase in the jitter characteristic, is regarded as the reproduction durability times. An explanation will be made about the procedure to determine the reproduction durability times by this standard, as exemplified by way of example by the experimental result (characteristic shown by the outline circles in FIG. 4) obtained at the test environment temperature of 25° C. and the reproducing laser power of 2.7 mW shown in FIG. 4. FIG. 7 specifically shows the method for determining the number of times of reproduction when the jitter begins to increase.

At first, as shown in FIG. 7, a tangential line (thick broken line shown in FIG. 7) is drawn in a region in which the number of times of reproduction is small and the initial value of the jitter is constant in the jitter characteristic. Subsequently, an approximate tangential line (thick dotted line shown in FIG. 7) is drawn in a region in which the jitter is linearly increased. The number of times of reproduction, which is provided at the point of intersection between the both approximate tangential lines, is regarded as the number of times of reproduction at which the jitter begins to increase, i.e., the reproduction durability times. As a result, the reproduction durability times was 58,000 in the case of the experimental result obtained at the test environment temperature of 25° C. and the reproducing laser power of 2.7 mW shown in FIG. 7.

The reproduction durability times, at which the jitter began to increase, was also determined from the jitter characteristics when the reproducing laser powers were 2.8 mW and 2.9 mW as shown in FIG. 4, in the same manner as described above. Obtained results are shown in Table 2.

TABLE 2

| Reproducing power Pr [mW] | 2.7 | 2.8 | 2.9 |
|---|---|---|---|
| 1,000/T | 2.1346 | 2.106 | 2.079 |
| Reproduction durability times | 58,000 | 20,000 | 8,900 |

Figure 8:
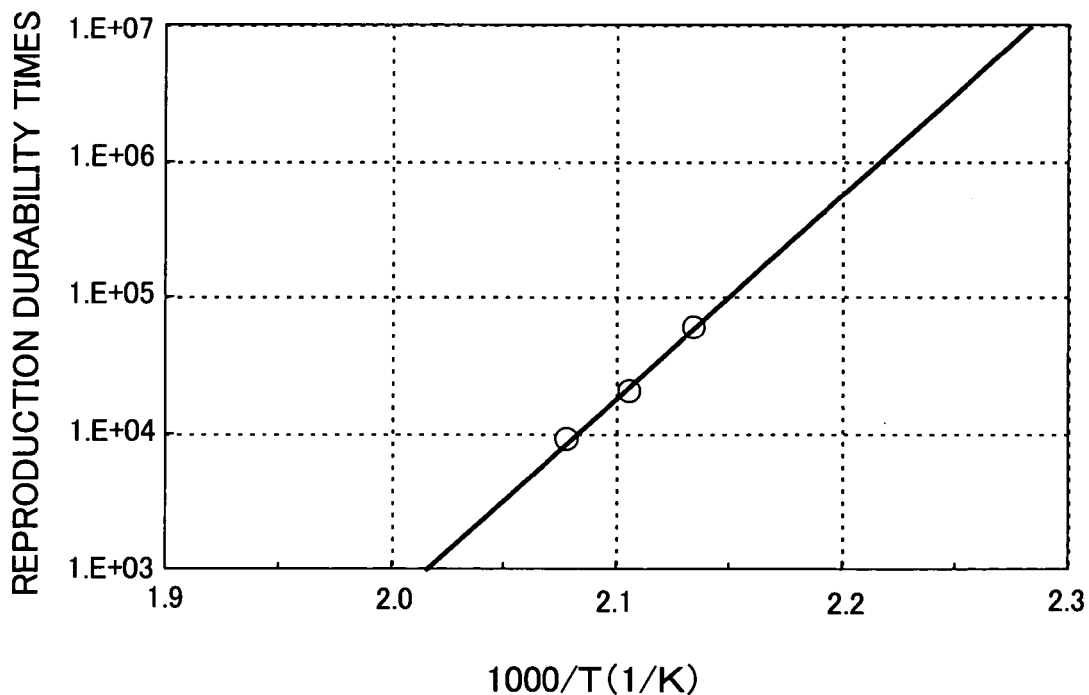
FIG. 8 shows a result of the Arrhenius plot executed in the modified embodiment.

FIG. 8 shows the result of execution of the Arrhenius plot by using 1,000/T and the reproduction durability times at which the jitter begins to increase as shown in Table 2. As shown in FIG. 8, the following fact has been also revealed in this embodiment, in the same manner as in FIG. 5 (first embodiment). That is, the proportional relationship holds between 1,000/T and the reproduction durability times at which the jitter begins to increase. The plot forms a straight line. According to this fact, the following fact is appreciated. That is, in the evaluation method of the present invention, it is also allowable to use the reproduction durability times to be obtained when the jitter begins to increase, as in this embodiment. It is possible to obtain the same result as that of the case in which the number of times of reproduction, at which the cross-erase jitter is 12%, is regarded as the reproduction durability times.

Second Embodiment

As described above, in the first embodiment, it has been demonstrated that the value of the maximum reproducing laser power (maximum allowable reproducing laser power) is 2.09 mW in order to guarantee that the reproduction durability times, at which the jitter is not more than 12%, is not less than one million times, when the information is reproduced under the condition in which the ambient temperature is not more than 60° C. and the linear velocity is 24.6 m/sec on the optical recording medium (DVD-RAM) of the first embodiment. In the second embodiment, the optical recording medium, on which the information about the maximum allowable reproducing laser power had been previously recorded, was loaded to the information-recording/reproducing apparatus to investigate the change of the jitter characteristic (deterioration characteristic) after the information of the data section previously recorded on the information-recording medium was subjected to the reproduction one million times with the reproducing laser power of 2.09 mW.

In general, as the recording velocity is increased, the number of revolutions of the spindle motor is increased as well. Accordingly, the amount of heat, which is generated from the spindle motor and the driver IC of the control unit of the spindle motor, is increased. As a result, the mechanical noise generated from the rotating section or the like is increased, and S/N of the address signal in relation to the position information for the recording and reproduction on the optical recording medium, is decreased. Therefore, as the recording velocity is increased, it is difficult to correctly record the information. As a result, the rewrite error is caused, and any harmful influence is exerted, for example, on the signal quality. A method, in which the reproducing laser power is increased when the address signal is reproduced, may be used as the method for increasing S/N of the address signal. However, in this method, it is feared that the signal quality of the data recorded on the optical recording medium may be deteriorated at an accelerated pace, when the reproducing laser power is excessively increased. In view of the circumstances as described above, it is important that the address signal is reproduced at a reproducing laser power which is as large as possible within a range in which the signal quality of the data recorded on the optical recording medium is not deteriorated so that the quality of the address signal is enhanced.

The optical recording medium used in this embodiment is an optical disk having the DVD-RAM format of 4.7 GB in the same manner as the first embodiment. In addition, in the case of the optical recording medium of this embodiment, the value of the recording velocity of 24.6 m/sec (6× velocity), the information about the recording waveform (information about the length of the recording pulse between the marks or the like), the information about the recording power and the value of the maximum allowable reproducing laser power (2.09 mW) at the recording velocity of 24.6 m/sec, the value of the recording velocity of 65.6 m/sec (16× velocity), the information about the recording waveform, the information about the recording power and the value of the maximum allowable reproducing laser power (3.30 mW) at the recording velocity of 65.6 m/sec, and the values of the ordinary reproducing laser power (1.00 mW) at the recording velocities of 24.6 m/sec and 65.6 m/sec, were previously recorded on the control data section of the optical recording medium. The value of 3.30 mW of the maximum allowable reproducing laser power at the recording velocity (linear velocity) of 65.6 m/sec is the value determined from the Arrhenius plot and is the upper limit value of the reproducing laser power at which the jitter is not more than 12% after the reproduction is performed one million times, in the same manner as the first embodiment described above. The optical recording medium of this embodiment, on which the information as described above had been previously recorded, was manufactured as follows. The construction of the films of the optical recording medium of this embodiment was the same as that in the first embodiment.

Figure 9:
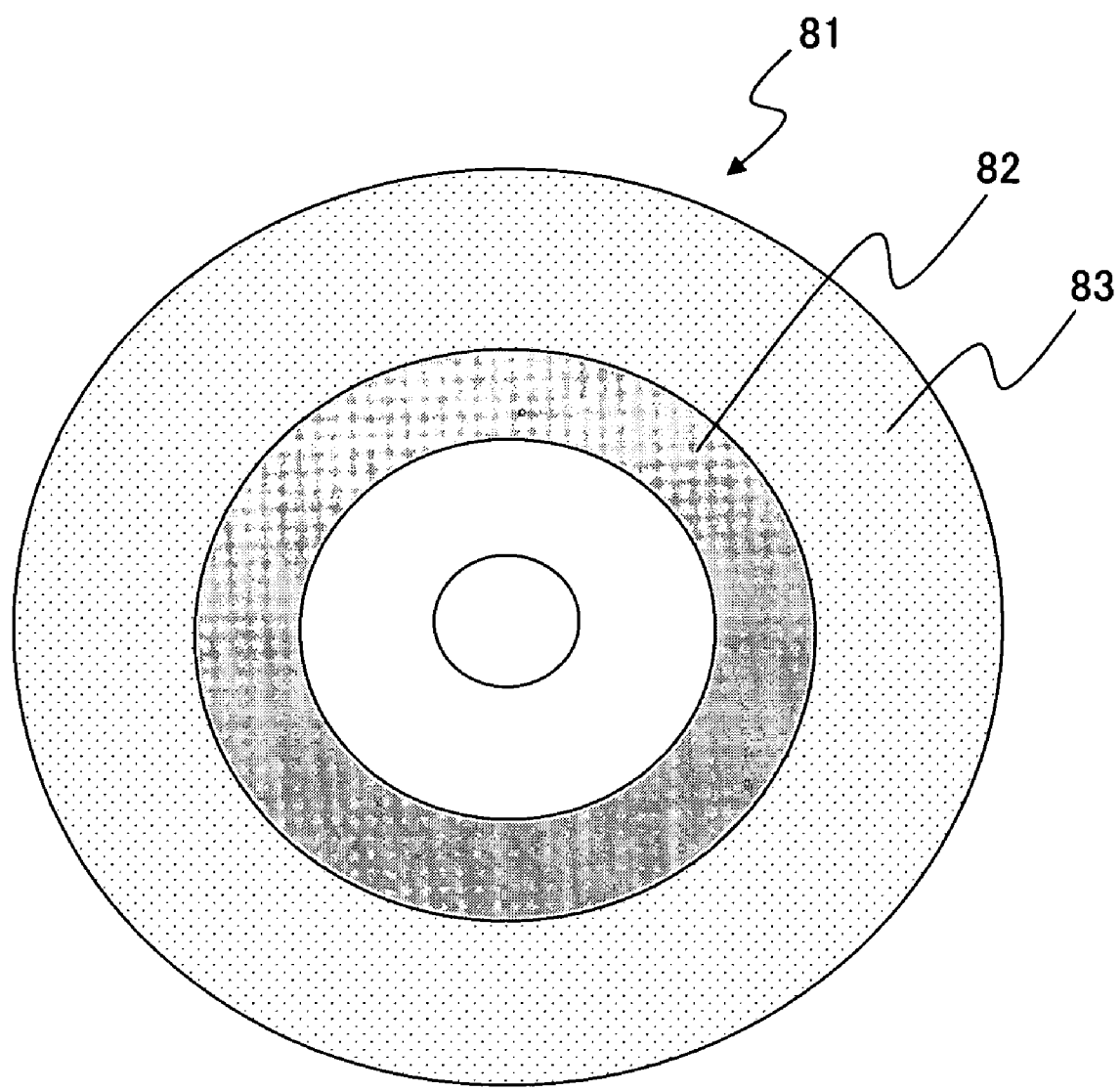
FIG. 9 shows a schematic plan view illustrating an optical recording medium manufactured in a second embodiment.

At first, a polycarbonate substrate having a diameter of 120 mm and a thickness of 0.6 mm, on which a guide groove having a track pitch of 1.2 μm and a groove depth of 63 nm was formed on the entire surface, was formed by means of the injection molding by using a stamper. Subsequently, each of the constitutive films was formed on the substrate in accordance with the sputtering process, in the same manner as the first embodiment. After that, the entire surface of the optical recording medium was crystallized by using a laser initializing apparatus to be initialized. Thus, the optical recording medium of this embodiment was manufactured. FIG. 9 schematically shows the format construction of the optical recording medium manufactured in this embodiment. As shown in FIG. 9, the optical recording medium 81 of this embodiment was provided with a control data section 82 and an information-recording section 83 which were disposed in this order from the inner circumferential side. The various information as described above, which were to be previously recorded on the optical recording medium, were recorded on the control data section 82. Specifically, the various information was recorded by pre-pits formed on the region of the substrate corresponding to the control data section 82 by injection molding.

The optical recording medium, which had been manufactured in accordance with the method as described above, was loaded to the information-recording/reproducing apparatus (hereinafter referred to as "drive" as well) to perform the recording at the recording velocity of 24.6 m/sec. After that, the reproducing laser power was set to 2.09 mW, and the reproduction was performed one million times to investigate the deterioration characteristic of the jitter. Further, the recording was performed at the recording velocity of 65.6 m/sec. After that, the reproducing laser power was set to 3.30 mW, and the reproduction was performed one million times to investigate the deterioration characteristic of the jitter. The construction of the drive, which was used in this embodiment, was basically the same as that used in the first embodiment (apparatus shown in FIG. 1).

Figure 10:
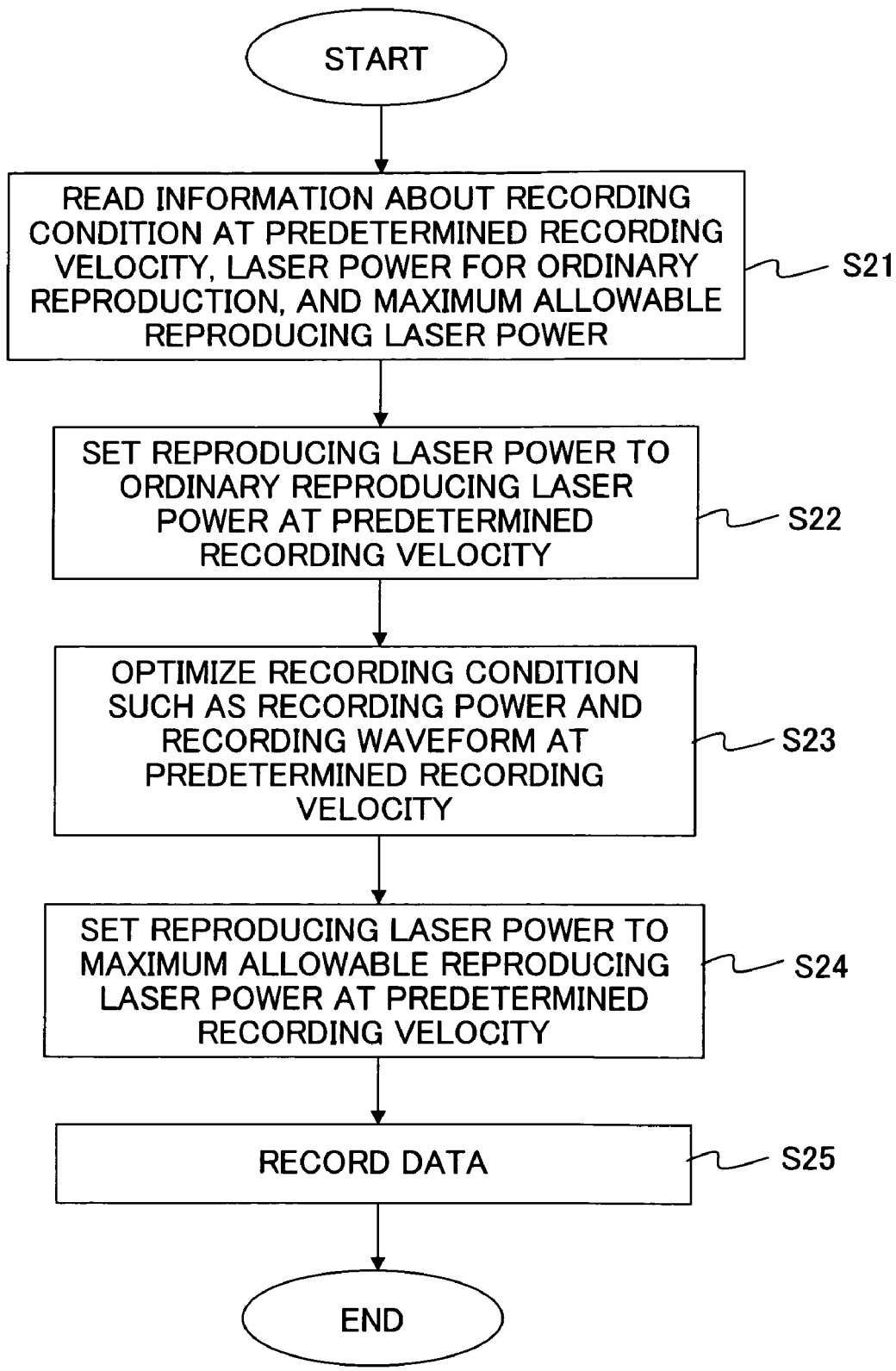
FIG. 10 shows a flow chart illustrating the operation of an information-recording/reproducing apparatus in the second embodiment.

An explanation will now be made with the reference to FIGS. 1 and 10 about the basic operation to be performed until the data recording with the drive when the deterioration characteristic of the jitter is investigated in this embodiment. FIG. 10 shows the flow of the basic operation of the drive in this embodiment. At first, the reproduction processing system 11 (information-processing section) of the drive was used to read the information about the recording waveform, the recording power, and the value of the ordinary recording laser power at each of the recording velocities recorded on the control data section of the optical recording medium (Step S21 shown in FIG. 10). Subsequently, the optimum recording condition-calculating unit 10 (control section) of the drive was used to set the reproducing laser power to the ordinary reproducing laser power of 1.00 mW (Step S22 shown in FIG. 10) to optimize the recording waveform and the recording power so that the data error was minimized (Step S23 shown in FIG. 10). Subsequently, the reproduction processing system 11 of the drive was used to read the information about the maximum allowable reproducing laser power at each of the recording velocities from the control data section of the optical recording medium. The optimum recording condition-calculating unit 10 of the drive was used to set the reproducing laser power to the maximum allowable reproducing laser power at each of the recording velocities (Step S24 shown in FIG. 10). Specifically, the reproducing laser power was set to 2.09 mW at the recording velocity of 24.6 m/sec, and the reproducing laser power was set to 3.30 mW at the recording velocity of 65.6 m/sec. Subsequently, the data was recorded on the information-recording section of the optical recording medium under the optimum condition at each of the recording velocities determined in Step S23 as described above (Step S25 shown in FIG. 10).

In this embodiment, the data recording (rewriting) was performed ten times at each of the recording velocities. After the data recording, the data, which had been recorded in conformity with the number of revolutions at each of the recording velocities, was reproduced one million times at the maximum allowable reproducing laser power at each of the recording velocities. In this embodiment, the jitter value immediately after the recording (initial jitter) and the jitter value of the reproduced track subjected after performing the reproduction one million times with the drive were measured to investigate the deterioration characteristic of the jitter. After the reproduction was performed one million times, the reproducing laser power was returned to the ordinary reproducing laser power of 1.00 mW.

Third Embodiment

In the third embodiment, the operation, which was performed until the data recording with the drive when the deterioration characteristic of the jitter was investigated, was different from the operation in the second embodiment. The deterioration characteristic of the jitter was investigated in the same manner as the second embodiment except that the operation of the drive was changed. In this embodiment, the construction of the optical recording medium and the drive were the same manner as that used in the second embodiment.

An explanation will be made with reference to FIG. 11 about the flow of the basic operation until the data recording with the drive in this embodiment. At first, the reproduction processing system 11 of the drive was used to read the information about the recording waveform, the recording power, and the information about the maximum allowable reproducing laser power at each of the recording velocities recorded on the control data section of the optical recording medium (Step S31 shown in FIG. 11). Subsequently, the optimum recording condition-calculating unit 10 of the drive was used to set the reproducing laser power to the maximum allowable reproducing laser power (Step S32 shown in FIG. 11). Specifically, the reproducing laser power was set to 2.09 mW at the recording velocity of 24.6 m/sec, and the reproducing laser power was set to 3.30 mW at the recording velocity of 65.6 m/sec. Subsequently, the recording waveform and the recording power were optimized at each of the recording velocities so that the data error was minimized at the reproducing laser power set in Step S32 (Step S33 shown in FIG. 11). Subsequently, the data was recorded on the information-recording section of the optical recording medium under the optimum condition at each of the recording velocities determined in Step S33 (Step S34 shown in FIG. 11).

Also in this embodiment, the data recording (rewriting) was performed ten times at each of the recording velocities in the same manner as in the second embodiment. The data, which had been recorded in conformity with the number of revolutions at each of the recording velocities, was reproduced one million times at the maximum allowable reproducing laser power at each of the recording velocities. Also in this embodiment, the jitter value immediately after the recording (initial jitter) and the jitter value of the reproduced track after performing the reproduction one million times with the drive were measured to investigate the deterioration characteristic of the jitter in the same manner as in the second embodiment. After the reproduction was performed one million times, the reproducing laser power was returned to the ordinary reproducing laser power of 1.00 mW.

Tables 3 and 4 show results of the jitter characteristics investigated in the second and third embodiments described above. Table 3 shows the jitter values obtained immediately after the data recording. Table 4 shows the jitter values obtained after performing the reproduction one million times.

TABLE 3

|  | Jitter value immediately after recording (recording linear velocity: 24.6 m/sec) | Jitter value immediately after recording (recording linear velocity: 65.6 m/sec) |
| --- | --- | --- |
| Second Embodiment | 7.8% | 8.8% |
| Third Embodiment | 7.4% | 8.0% |

TABLE 4

|  | Jitter value after reproduction one million times (recording linear velocity: 24.6 m/sec) | Jitter value after reproduction one million times (recording linear velocity: 65.6 m/sec) |
| --- | --- | --- |
| Second Embodiment | 11.9% | 11.8% |
| Third Embodiment | 11.4% | 11.1% |

As clarified from the result shown in Table 3, it has been revealed that the jitter value (initial jitter) is not more than 9.0% at any one of the recording velocities of 24.6 m/sec and 65.6 m/sec in both of the second and third embodiments, and the satisfactory recording characteristic is obtained.

As clarified from Table 3, the initial jitter was lowered by 0.4% at the recording velocity of 24.6 m/sec when the recording condition was optimized at the maximum allowable reproducing laser power of 2.09 mW (third embodiment) as compared with the case in which the recording condition was optimized at the ordinary reproducing laser power of 1.00 mW (second embodiment). Further, the initial jitter was lowered by 0.8% at the recording velocity of 65.6 m/sec when the recording condition was optimized at the maximum allowable reproducing laser power of 3.30 mW (third embodiment) as compared with the case in which the recording condition was optimized at the ordinary reproducing laser power of 1.00 mW (second embodiment). That is, the effect was obtained such that the initial jitter was further lowered (jitter characteristic was improved) at the recording velocity of 65.6 m/sec as compared with the case of the recording velocity of 24.6 m/sec.

The following fact may be considered in relation to the above. That is, in the case of the high velocity recording in which the recording velocity is 24.6 m/sec or 65.6 m/sec, the amount of heat, which is generated by the spindle motor and the driver IC of the spindle motor control unit, is increased as described above, and the mechanical noise of the rotating section or the like is increased. Therefore, it is difficult to determine the optimum condition for recording the information. For this reason, in order to determine the optimum recording condition more correctly, it is advantageous that the value of the reproducing laser power is high. As a result, it is considered that the recording jitter is lowered in the third embodiment in which the reproducing laser power is larger when the recording condition is determined as shown in Table 3. In addition, in the third embodiment, the reproducing laser power, which is adopted when the recording condition is determined, is the maximum reproducing laser power to guarantee the reproduction durability times to be not less than one million times. Therefore, the signal quality of the data recorded on the optical recording medium is not deteriorated.

As clarified from Table 4, the jitter value, which was obtained after performing the reproduction one million times with the maximum allowable reproducing laser power of 2.09 mW at the linear velocity of 24.6 m/sec, was not more than 12.0% in both of the second and third embodiments. Further, the jitter value, which was obtained after performing the reproduction one million times with the maximum allowable reproducing laser power of 3.30 mW at the linear velocity of 65.6 m/sec, was not more than 12.0% in both of the second and third embodiments as well. According to this result, in the optical recording medium and the information-recording/reproducing apparatus used in the second and third embodiments, it has been revealed that the jitter value is not more than 12% even when the reproduction is performed one million times, and it is possible to guarantee the reproduction durability on the condition that the information is reproduced at the reproducing laser power of not more than the maximum allowable reproducing laser power.

In the first to third embodiments described above, the reproduction durability experiment is performed for the data on the groove. However, the present invention is not limited thereto. The same or equivalent effect is obtained even when the reproduction durability experiment is performed on the land. In the first embodiment, the reproduction durability is investigated at the linear velocity of 24.6 m/sec. However, the reproduction durability of the optical recording medium can be evaluated depending on the reproducing velocity by determining the laser power corresponding to the melting point or the decomposition point of the recording layer at the reproducing velocity. Also in this case, it is possible to obtain the same effect as the first embodiment.

In the first to third embodiments described above, the explanation has been made for the case of use of DVD-RAM used the red laser having the wavelength of 655 nm as the optical recording medium. However, the present invention is not limited thereto. The method for evaluating the optical recording medium of the present invention is also equivalently applicable to DVD+RW and DVD-RW in which the film that is formed of the same phase-change material as that in the first to third embodiments is used for the recording layer, and DVD-R and DVD+R in which the write-once type dye-based material is used for the recording layer. In addition, in this case, the same or equivalent effect can be obtained. Specifically, when the recording layer is the recording layer formed of the dye, the recording operating temperature of the recording layer is regarded as the decomposition point to determine the laser power corresponding to the recording operating temperature of the recording layer from the change characteristic of the reflectance in the same manner as in the first embodiment. After that, the evaluation may be made in accordance with the same method as that used in the first embodiment.

The method for evaluating the optical recording medium of the present invention is also applicable to the MO disk in which the recording layer is the magneto-optical recording layer, and the effect as described above is equivalently obtained. In this case, the recording operating temperature of the recording layer is regarded as the Curie point to determine the laser power corresponding to the recording operating temperature of the recording layer from the change characteristic of the electric signal represented the change of the magnetization direction of the optical recording medium or the rotation of the polarization of the light. After that, the evaluation may be made in accordance with the same method as that used in the first embodiment.

The method for evaluating the optical recording medium of the present invention does not depend on the wavelength of the laser. Therefore, the method for evaluating the optical recording medium of the present invention is also applicable to the optical disk used the blue laser such as Blu-ray and HD-DVD, and the same or equivalent effect is obtained.

The first to third embodiments have been explained for the case in which the recording layer is the single layer. However, the present invention is not limited thereto. The present invention is also applicable to the optical recording medium having a plurality of recording layers, and the same or equivalent effect is obtained. In this case, the present invention is applicable irrelevant to the number of the layers of the recording layers when the data can be recorded and reproduced with the laser in each of the recording layers.

The relative humidity is not especially referred to in the first to third embodiments described above. However, it is preferable to evaluate the reproduction durability of the optical recording medium by executing the Arrhenius plot under a condition in which the relative humidity is as constant as possible.

The method for evaluating the optical recording medium of the present invention makes it possible to evaluate the reproduction durability highly accurately in a short period of time at an arbitrary ambient temperature and/or an arbitrary reproducing laser power. Therefore, the method for evaluating the optical recording medium of the present invention is most suitable as the method for evaluating the reproduction durability of every optical recording medium provided with the recording layer.

What is claimed is:

1. A method for evaluating reproduction durability of an optical recording medium which has a recording layer and from which information is reproduced by irradiation of a laser beam, the method comprising:

determining an operating laser power for heating the recording layer to a recording operating temperature;

determining a temperature of the recording layer when a laser beam having a predetermined reproducing laser power is radiated during a data reproduction, on the basis of an ambient temperature, the reproducing laser power during the data reproduction, and the operating laser power for heating the recording layer to the recording operating temperature;

determining a relationship between the reproducing laser power during the data reproduction and reproduction durability times at the reproducing laser power;

determining a relationship between the temperature of the recording layer during the data reproduction and the reproduction durability times, from the relationship between the reproducing laser power during the data reproduction and the reproduction durability times; and determining the reproduction durability times at a desired ambient temperature and a desired reproducing laser power, from the relationship between the temperature of the recording layer and the reproduction durability times at the reproducing laser power.

2. The method for evaluating the optical recording medium according to claim 1, wherein the determination of the reproduction durability times at the desired ambient temperature and the desired reproducing laser power includes execution of an Arrhenius plot on the basis of the temperature of the recording layer during the data reproduction and the reproduction durability times at the reproducing laser power.

3. The method for evaluating the optical recording medium according to claim 1, wherein a temperature Tr which is the temperature of the recording layer during the data reproduction is determined from the following relational expression:

$$Tr = (Pr \times (Tm - Tc)/Pm) + Tt$$

wherein Tm represents the recording operating temperature of the recording layer, Pm represents the operating laser power, Tc represents an ambient temperature when the operating laser power Pm is determined, Tt represents the ambient temperature during the data reproduction, and Pr represents the reproducing laser power during the data reproduction.

4. The method for evaluating the optical recording medium according to claim 1, wherein the recording operating temperature of the recording layer is a melting point of the recording layer.

5. The method for evaluating the optical recording medium according to claim 4, wherein the operating laser power is determined from a change characteristic of a reflectance of the optical recording medium with respect to a laser power, and is a laser power in which the reflectance of the optical recording medium begins to change in the change characteristic.

6. The method for evaluating the optical recording medium according to claim 1, wherein the recording operating temperature of the recording layer is a Curie point of the recording layer.

7. The method for evaluating the optical recording medium according to claim 6, wherein the operating laser power is determined from a change characteristic of a direction of magnetization of the optical recording medium with respect to a laser power, and is a laser power in which the direction of magnetization of the optical recording medium begins to change in the change characteristic.

8. The method for evaluating the optical recording medium according to claim 1, wherein the operating laser power is determined from a change characteristic of a reflectance or of a direction of magnetization of the optical recording medium with respect to a laser power, and is determined on the basis of a plurality of values of the reflectance or a plurality of values of the direction of magnetization in a laser power region of the change characteristic corresponding to a state in which the temperature of the recording layer is higher than the recording operating temperature.

9. The method for evaluating the optical recording medium according to claim 1, further comprising determining a maximum value of the reproducing laser power which is capable of guaranteeing the reproduction durability times at the desired ambient temperature and the desired reproducing laser power.

10. The method for evaluating the optical recording medium according to claim 1, wherein the recording operating temperature of the recording layer is a decomposition point of the recording layer.

11. The method for evaluating the optical recording medium according to claim 6, wherein the operating laser power is determined from a change characteristic of a reflectance of the optical recording medium with respect to a laser power, and is a laser power in which the reflectance of the optical recording medium begins to change in the change characteristic.

12. A method for evaluating reproduction durability of an optical recording medium which is provided with a recording layer and in which information is reproduced by irradiation of a laser beam, the method comprising:

determining an operating laser power for heating the recording layer to an operating point temperature;

determining reproduction durability times at a plurality of reproducing laser powers respectively;

determining a temperature of the recording layer at each of the reproducing laser powers on the basis of each of the reproducing laser powers, an ambient temperature when the laser beam is radiated at each of the reproducing laser powers, and the operating laser power for heating the recording layer to the recording operating temperature;

executing an Arrhenius plot on the basis of the temperatures of the recording layer and the reproduction durability times at the plurality of reproducing laser powers; and determining a reproduction durability times at a desired ambient temperature and a desired reproducing laser power, on the basis of a result of the Arrhenius plot.

* * * * *